United States Patent
Kondo et al.

[11] Patent Number: 5,912,708
[45] Date of Patent: Jun. 15, 1999

[54] PICTURE SIGNAL ENCODING DEVICE, PICTURE SIGNAL ENCODING METHOD, PICTURE SIGNAL DECODING DEVICE, PICTURE SIGNAL DECODING METHOD, AND RECORDING MEDIUM

[75] Inventors: Tetsujiro Kondo; Kenji Takahashi, both of Kanagawa, Japan

[73] Assignee: Sony Corporation, Tokyo, Japan

[21] Appl. No.: 09/136,151

[22] Filed: Aug. 18, 1998

Related U.S. Application Data

[63] Continuation of application No. PCT/JP97/04912, Dec. 26, 1997.

[30] Foreign Application Priority Data

Dec. 26, 1996 [JP] Japan ................................. 8-347310

[51] Int. Cl.⁶ ................................................. H04N 7/36
[52] U.S. Cl. ................................. 348/415; 386/112
[58] Field of Search .............................. 348/394, 409, 348/410, 415, 416; 386/112; H04N 7/36

[56] References Cited

U.S. PATENT DOCUMENTS

| 5,021,880 | 6/1991 | Graves | 348/411 |
|---|---|---|---|
| 5,541,658 | 7/1996 | Ishiwata | 348/415 |

FOREIGN PATENT DOCUMENTS

| 63-48088 | 2/1988 | Japan . |
|---|---|---|
| 2-65372 | 3/1990 | Japan . |
| 3-6185 | 1/1991 | Japan . |
| 3-35678 | 2/1991 | Japan . |
| 5-506975 | 10/1993 | Japan . |
| 7-46548 | 2/1995 | Japan . |
| 7-79418 | 3/1995 | Japan . |
| 7-95591 | 4/1995 | Japan . |
| 7-154642 | 6/1995 | Japan . |
| 8-46934 | 2/1996 | Japan . |
| 8-51598 | 2/1996 | Japan . |
| 8-84335 | 3/1996 | Japan . |
| 8-84336 | 3/1996 | Japan . |

*Primary Examiner*—Howard Britton
*Attorney, Agent, or Firm*—Limbach & Limbach L.L.P.

[57] ABSTRACT

In the present invention, a virtual pixel (indicated by ⊚ in FIG. 18) is assumed near an SD pixel (indicated by ○0 in FIG. 18) constituting an SD picture obtained by thinning an HD picture, and the pixel value of the virtual pixel is found from the HD picture. A part of the pixel value of the virtual pixel is arranged in place of a part of the pixel value of the SD pixel. Then, one of the SD pixels is used as a notable pixel so as to form a prediction tap from the SD pixel around the notable pixel and the virtual pixel. By linear combination between the prediction tap and a predetermined prediction coefficient, adaptive processing for finding a prediction value of the HD picture is carried out. In addition, a prediction error of the prediction value found by adaptive processing with respect to the HD picture is calculated, and the pixel value of the notable pixel is corrected in accordance with the prediction error. Thus, a decoded picture more proximate to an original picture may be obtained without deteriorating the coding efficiency.

29 Claims, 24 Drawing Sheets

PICTURE SIGNAL ENCODING DEVICE, PICTURE SIGNAL ENCODING METHOD, PICTURE SIGNAL DECODING DEVICE, PICTURE SIGNAL DECODING METHOD, AND RECORDING MEDIUM

This application is a continuation of international application number PCT JP/97/04912, filed Dec. 26, 1997, now pending.

TECHNICAL FIELD

This invention relates to a picture signal encoding device, a picture signal encoding method, a picture signal decoding device, a picture signal decoding method, and a recording medium. Particularly, it relates to a picture signal encoding device and a picture signal encoding method for compression-coding a picture by thinning pixels thereof, a picture signal decoding device and a picture signal decoding method for decoding a compression-coded picture, and a recording medium on which a compression-coded picture is recorded.

BACKGROUND ART

In the case where a picture of standard resolution or low resolution (hereinafter referred to as an SD picture) is to be converted to a picture of high resolution (hereinafter referred to as an HD picture) or in the case where a picture is to be enlarged, the pixel value of a lacked pixel is interpolated (compensated) by a so-called interpolation filter.

However, since a component (high-frequency component) of the HD picture which is not included in the SD picture cannot be restored even by carrying out interpolation of a pixel by the interpolation filter, it has been difficult to provide a picture of high resolution.

Thus, the present Assignee has proposed a picture converting device (picture converting circuit) for converting an SD picture to an HD picture which also includes a high-frequency component not included in the SD picture.

In this picture converting device, adaptive processing for finding a prediction value of a pixel of the HD picture is carried out by linear combination of the SD picture and a predetermined prediction coefficient, thereby restoring the high-frequency component not included in the SD picture.

Specifically, it is now assumed that, for example, a prediction value $E[y]$ of a pixel value y of a pixel constituting the HD picture (hereinafter referred to as an HD pixel) is to be found from a linear primary combination model prescribed by linear combination of pixel values (hereinafter referred to as learning data) $x_1, x_2, \ldots$ of several pixels constituting the SD picture (hereinafter referred to as SD pixels) and predetermined prediction coefficients $w_1, w_2, \ldots$. In this case, the prediction value $E[y]$ may be expressed by Equation 1.

$$E[y] = w_1 x_1 + w_2 x_2 + \ldots \quad \text{Equation 1}$$

If a matrix W consisting of a set of prediction coefficients w is defined by Equation 2, and a matrix X consisting of a set of learning data is defined by Equation 3 while a matrix Y' consisting of a set of prediction values $E[y]$ is defined by Equation 4, in order to generalize the model, an observational equation like Equation 5 is obtained.

$$X = \begin{bmatrix} x_{11} & x_{12} & \cdots & x_{1n} \\ x_{21} & x_{22} & \cdots & x_{2n} \\ \cdots & \cdots & \cdots & \cdots \\ x_{m1} & x_{m2} & \cdots & x_{mn} \end{bmatrix} \quad \text{Equation 2}$$

$$W = \begin{bmatrix} w_1 \\ w_2 \\ \cdots \\ w_n \end{bmatrix} \quad \text{Equation 3}$$

$$Y' = \begin{bmatrix} E[y_1] \\ E[y_2] \\ \cdots \\ E[y_m] \end{bmatrix} \quad \text{Equation 4}$$

$$XW = Y' \quad \text{Equation 5}$$

Then, it is assumed that a prediction value $E[y]$ proximate to a pixel value y of the HD pixel is to be found by applying a minimum square method to the observational equation. In this case, if a matrix Y consisting of true pixel values y of the HD pixels to be teacher data is defined by Equation 6 while a matrix E consisting of residuals e of the prediction values $E[y]$ with respect to the pixel values y of the HD pixels is defined by Equation 7, a residual equation like Equation 8 is obtained from Equation 5.

$$Y = \begin{bmatrix} y_1 \\ y_2 \\ \cdots \\ y_m \end{bmatrix} \quad \text{Equation 6}$$

$$E = \begin{bmatrix} e_1 \\ e_2 \\ \cdots \\ e_m \end{bmatrix} \quad \text{Equation 7}$$

$$XW = Y + E \quad \text{Equation 8}$$

In this case, a prediction coefficient $w_i$ for finding the prediction value $E[y]$ proximate to the pixel value y of the HD pixel may be found by minimizing the square error expressed by Formula 9.

$$\sum_{i=1}^{m} e_i^2 \quad \text{Formula 9}$$

Therefore, if the value obtained by differentiating the square error of Formula 9 by the prediction coefficient $w_i$ is 0, that is, if Equation 10 is satisfied, the prediction value $w_i$ is the optimum value for finding the prediction value $E[y]$ proximate to the pixel value y of the HD pixel.

$$e_1 \frac{\partial e_1}{\partial w_i} + e_2 \frac{\partial e_2}{\partial w_i} + \ldots + e_m \frac{\partial e_m}{\partial w_i} = 0 (i = 1, 2, \ldots, n) \quad \text{Equation 10}$$

Thus, by differentiating Equation 8 by the prediction coefficient $w_i$, Equation 11 is obtained.

$$\frac{\partial e_i}{\partial w_1} = x_{i1}, \frac{\partial e_i}{\partial w_2} = x_{i2}, \ldots, \frac{e_i}{\partial w_n} = x_{in}(i = 1, 2, \ldots, m) \quad \text{Equation 11}$$

Equation 12 is obtained from Equations 10 and 11.

$$\sum_{i=1}^{m} e_i x_{i1} = 0, \sum_{i=1}^{m} e_1 x_{i2} = 0, \ldots, \sum_{i=1}^{m} e_i x_{in} = 0 \quad \text{Equation 12}$$

In addition, in consideration of the relation between the learning data x, the prediction coefficient w, the teacher data y and the residual e in the residual equation of Equation 8, a normal equation like Equation 13 may be obtained from Equation 12.

$$\left(\sum_{i=1}^{m} x_{i1} x_{i1}\right) w_1 + \left(\sum_{i=1}^{m} x_{i1} x_{i2}\right) w_2 + \ldots + \quad \text{Equation 13}$$

$$\left(\sum_{i=1}^{m} x_{i1} x_{in}\right) w_n = \sum_{i=1}^{m} x_{i1} y_i$$

$$\left(\sum_{i=1}^{m} x_{i2} x_{i1}\right) w_1 + \left(\sum_{i=1}^{m} x_{i2} x_{i2}\right) w_2 + \ldots +$$

$$\left(\sum_{i=1}^{m} x_{i2} x_{in}\right) w_n = \sum_{i=1}^{m} x_{i2} y_i$$

$$\ldots$$

$$\left(\sum_{i=1}^{m} x_{in} x_{i1}\right) w_1 + \left(\sum_{i=1}^{m} x_{in} x_{i2}\right) w_2 + \ldots +$$

$$\left(\sum_{i=1}^{m} x_{in} x_{in}\right) w_n = \sum_{i=1}^{m} x_{in} y_i$$

The normal equation of Equation 13 may be established for the same number as the number of prediction coefficients w to be found. Therefore, the optimum prediction coefficient w may be found by solving Equation 13. (However, to solve Equation 13, the matrix consisting of the coefficients according to the prediction coefficients w must be regular.) In solving Equation 13, for example, a sweep method (Gauss-Jordan elimination method) may be applied.

In the foregoing manner, the optimum prediction coefficients w are found. Then, by using these prediction coefficients w, the prediction value E[y] proximate to the pixel value y of the HD pixel is found by Equation 1. The foregoing processing is adaptive processing. (Adaptive processing includes processing to find the prediction coefficients w in advance and find the prediction value by using the prediction coefficients w.)

Adaptive processing differs from interpolation processing in that a component included in the HD picture which is not included in the SD picture is reproduced. Specifically, though adaptive processing is equal to interpolation processing using the so-called interpolation filter as far as Equation 1 is concerned, the prediction coefficient w corresponding to the tap coefficient of the interpolation filter is found from so-called learning by using teacher data y, thus enabling reproduction of the component included in the HD picture. That is, in adaptive processing, a picture of high resolution may be easily obtained. In other words, it may be understood that adaptive processing is processing which has a picture creation effect.

FIG. 1 shows an example of the structure of a picture converting device (picture converting circuit) for converting an SD picture into an HD picture by adaptive processing as described above based on the characteristics (class) of the picture.

The SD picture is supplied to a classifying circuit 101 and a delay circuit 102. The classifying circuit 101 sequentially uses SD pixels constituting the SD picture as notable pixels, and classifies the notable pixels into predetermined classes.

Specifically, the classifying circuit 101 first forms a block (hereinafter referred to as a processing block) by collecting several SD pixels around a notable pixel, and supplies a value allocated in advance to a pattern of pixel value of all the SD pixels constituting the processing block, as the class of the notable pixel, to an address terminal (AD) of a coefficient ROM 104.

Specifically, the classifying circuit 101 extracts, for example, a processing block made up of 5×5 SD pixels (indicated by ○ in FIG. 2) around a notable pixel from the SD picture, as indicated by a rectangle of dotted line in FIG. 2, and outputs a value corresponding to a pattern of pixel value of these 25 SD pixels as the class of the notable pixel.

In the case where a large number of bits like eight bits are allocated to express the pixel value of each SD pixel, the number of patterns of pixel values of the 25 SD pixels is extremely large such as $(2^8)^{25}$ patterns. Therefore, it is difficult to carry out the subsequent processing quickly.

Thus, as preprocessing prior to classification, processing for reducing the number of bits of the SD pixels constituting the processing block, for example, ADRC (adaptive dynamic range coding) processing, is carried out on the processing block.

In ADRC processing, first, an SD pixel having the maximum pixel value (hereinafter referred to as a maximum pixel) and an SD pixel having the minimum pixel value (hereinafter referred to as a minimum pixel) are detected from among the 25 SD pixels constituting the processing block. Then, the difference DR between the pixel value MAX of the maximum pixel and the pixel value MIN of the minimum pixel (=MAX−MIN) is calculated, and this DR is used as a local dynamic range of the processing block. On the basis of the dynamic range DR, the value of each pixel constituting the processing block is re-quantized to K bits which is smaller than the original number of allocated bits. That is, the pixel value MIN of the minimum pixel is subtracted from the pixel value of each pixel constituting the processing block, and each substraction value is divided by $DR/2^K$.

As a result, the value of each pixel constituting the processing block is expressed by K bits. Therefore, if K=1, the number of patterns of pixel values of the 25 SD pixels is $(2^1)^{25}$, which is much smaller than the number of patterns in the case where ADRC processing is not carried out. ADRC processing for expressing the pixel value by K bits is hereinafter referred to as K-bit ADRC processing.

The coefficient ROM 104 stores, every class, a set of prediction coefficients found by learning in advance. When a class is supplied from the classifying circuit 101, the coefficient ROM 104 reads out a set of prediction coefficients stored at an address corresponding to the class, and supplies the read-out set of prediction coefficients to a prediction processing circuit 105.

Meanwhile, the delay circuit 102 delays the SD picture only by a time necessary for causing a timing at which the set of prediction coefficients are supplied from the coefficient ROM 104 to the prediction processing circuit 105 and a timing at which a prediction tap is supplied from a prediction tap generating circuit 103, as later described, to coincide with each other. The delay circuit 102 then supplies the delayed SD picture to the prediction tap generating circuit 103.

The prediction tap generating circuit 103 extracts, from the SD picture supplied thereto, an SD pixel used for finding a prediction value of a predetermined HD pixel in the prediction processing circuit 105, and supplies the extracted SD pixel as a prediction tap to the prediction processing circuit 105. Specifically, the prediction tap generating circuit 103 extracts, from the SD picture, the same processing block as the processing block extracted by the classifying circuit 101, and supplies the SD pixels constituting the processing block as the prediction tap to the prediction processing circuit 105.

The prediction processing circuit 105 carries out arithmetic processing of Equation 1, that is, adaptive processing using the prediction coefficients $w_1$, $w_2$, . . . from the coefficient ROM 104 and the prediction taps $x_1$, $x_2$, . . . from the prediction tap generating circuit 103, thereby finding the prediction value E[y] of the notable pixel y. The prediction processing circuit 105 outputs this prediction value as the pixel value of the HD pixel.

For example, the prediction value of an HD pixel of 3×3 pixels (indicated by points • in FIG. 2) around the notable pixel, surrounded by a rectangle of solid line in FIG. 2, is found from one prediction tap. In this case, the prediction processing circuit 105 carries out arithmetic processing of Equation 1 with respect to the nine HD pixels. Therefore, the coefficient ROM 104 stores nine sets of prediction coefficients at an address corresponding to one class.

Similar processing is carried out by using the other SD pixels as notable pixels. Thus, the SD picture is converted to the HD picture.

FIG. 3 shows an example of the structure of a learning device (learning circuit) for carrying out learning for calculating prediction coefficients to be stored in the coefficient ROM 104 of FIG, 1.

The HD picture to be teacher data y in learning is supplied to a thinning circuit 111 and a delay circuit 114. The thinning circuit 111 reduces the number of pixels of the HD picture by thinning, thus forming an SD picture. This SD picture is supplied to a classifying circuit 112 and a prediction tap generating circuit 113.

The classifying circuit 112 and the prediction tap generating circuit 113 carry out processing similar to the processing by the classifying circuit 101 and the prediction tap generating circuit 103 of FIG. 1, thus outputting the class of a notable pixel and a prediction tap, respectively. The class outputted by the classifying circuit 112 is supplied to address terminals (AD) of a prediction tap memory 115 and a teacher data memory 116. The prediction tap outputted by the prediction tap generating circuit 113 is supplied to the prediction tap memory 115.

The prediction tap memory 115 stores the prediction tap supplied from the prediction tap generating circuit 113, at an address corresponding to the class supplied from the classifying circuit 112.

Meanwhile, the delay circuit 114 delays the HD picture only by a time during which the class corresponding to the notable pixel is supplied from the classifying circuit 112 to the teacher data memory 116. The delay circuit 114 supplies only the pixel values of the HD pixels located around the SD pixel as the notable pixel, as teacher data, to the teacher data memory 116.

The teacher data memory 116 stores the teacher data supplied from the delay circuit 114, at an address corresponding to the class supplied from the classifying circuit 112.

Similar processing is repeated until all the HD pixels constituting the HD pictures prepared for learning are used as notable pixels.

Thus, at the same address in the prediction tap memory 115 or the teacher data memory 116, the pixel value of SD pixels having the same positional relation as the SD pixels indicated by ○ in FIG. 2 or HD pixels having the same positional relation as the HD pixels indicated by • are stored as learning data x or teacher data y.

In the prediction tap memory 115 and the teacher data memory 116, plural pieces of information may be stored at the same address. Therefore, at the same address, plural learning data x and teacher data y classified into the same class may be stored.

After that, the arithmetic circuit 117 reads out the prediction tap as the learning data or the pixel values of the HD pixels as the teacher data, stored at the same address in the prediction tap memory 115 or the teacher data memory 116, and calculates a set of prediction coefficients for minimizing an error between the prediction value and the teacher data by a minimum square method using the read-out data. That is, the arithmetic circuit 117 establishes the normal equation of Equation 13 for every class and solves this equation to find a set of prediction coefficients for every class.

Thus, the set of prediction coefficients for every class found by the arithmetic circuit 117 is stored at an address corresponding to the class in the coefficient ROM 104 of FIG. 1.

In learning processing as described above, in some cases, a class such that a necessary number of normal equations for finding prediction coefficients cannot be obtained is generated. With respect to such class, a set of prediction coefficients obtained by establishing and solving normal equations while ignoring the class is used as a so-called default set of prediction coefficients.

With the picture converting device of FIG. 1, from the SD picture obtained by reducing the number of pixels of the HD picture by thinning, the HD picture including high-frequency components not included in the SD picture may be obtained as described above. However, the proximity to the original HD picture is limited for the following reason. That is, it is considered that the pixel value of the pixel (SD pixel) of the SD picture obtained only by thinning the number of pixels of the HD picture is not optimum for restoring the original HD picture.

Thus, the present Assignee has proposed picture compression (coding) utilizing adaptive processing in order to obtain a decoded picture of quality proximate to that of the original HD picture (for example, in the JP Patent Application No.Hei 8-206552).

Specifically, FIG. 4 shows an example of the structure of a picture signal encoding device for compression (coding) an original HD picture to an optimum SD picture so as to obtain a decoded picture proximate to the original HD picture by adaptive processing.

The HD picture as an encoding target is supplied to a thinning section 121 and an error calculating section 124.

The thinning section 121 makes an SD picture simply by thinning the pixels of the HD picture, and supplies the SD picture to a correcting section 122. On receiving the SD picture from the thinning section 121, the correcting section 122, at first, directly outputs the SD picture to a local decode section 123. The local decode section 123 has a structure similar to that of the picture converting device of FIG. 1, for example. By carrying out adaptive processing as described above by using the SD picture from the correcting section 122, the local decode section 123 calculates a prediction value of the HD pixel and outputs the prediction value to the error calculating section 124. The error calculating section 124 calculates a prediction error of the prediction value of the HD pixel from the local decode section 123 with respect to the original HD pixel, and outputs the prediction error to a control section 125. The control section 125 controls the correcting section 122 in accordance with the prediction error from the error calculating section 124.

Thus, the correcting section 122 corrects the pixel value of the SD picture from the thinning section 121 under the control of the control section 125, and outputs the corrected pixel value to the local decode section 123. The local decode section 123 again finds a prediction value of the HD picture by using the corrected SD picture supplied from the correcting section 122.

Similar processing is repeated, for example, until the prediction error outputted from the error calculating section 124 reaches a predetermined value or less.

When the prediction error outputted from the error calculating section 124 reaches the predetermined value or less, the control section 125 controls the correcting section 122 so as to output the corrected SD picture at the time when the prediction error reaches the predetermined value or less, as an optimum encoding result of the HD picture.

Thus, by carrying out adaptive processing on this corrected SD picture, an HD picture having a prediction error at the predetermined value or less may be obtained.

The SD picture thus outputted from the picture signal encoding device of FIG. 4 may be regarded as the optimum SD picture for obtaining a decoded picture proximate to the original HD picture. Therefore, the processing carried out in a system constituted by the correcting section 122, the local decode section 123, the error calculating section 124 and the control section 125 of the picture signal encoding device may be referred to as optimization processing.

Meanwhile, to obtain a prediction value more proximate to the pixel value of the original HD pixel, it is preferred that the prediction tap used in adaptive processing is constituted from a large number of SD pixels close to the HD pixel as the target for finding the prediction value.

However, if the prediction tap is constituted from a large number of SD pixels, SD pixels relatively far from the HD pixel as the target for finding the prediction value are included in the prediction tap. Therefore, in this case, SD pixels expressing an object difference from the object expressed by the HD pixel as the target for finding the prediction value might be included in the prediction tap. Consequently, the precision of the prediction value is deteriorated, and a decoded picture formed by this prediction value is deteriorated.

Thus, it may be considered to use a method for reducing the number of pixels to be thinned from the HD picture in the thinning section 121 of the picture signal encoding device of FIG. 4 and thus increasing SD pixels close to the HD pixel as the target for finding the prediction value. However, this deteriorates the coding efficiency.

DISCLOSURE OF THE INVENTION

In view of the foregoing status of the art, it is an object of this invention to enable realization of a decoded picture more proximate to an original picture, without deteriorating the coding efficiency.

A picture signal encoding device for encoding a picture signal according to the present invention includes: a compressing section for generating a compressed picture signal having a number of pixels smaller than the number of pixels of an original picture signal; a first calculating section for assuming a virtual pixel near a compressed pixel of a pixel constituting the original picture signal so as to calculate the pixel value of the virtual pixel from the original picture signal; a replacing section for replacing a part of the pixel value of the compressed pixel with a part of the pixel value of the virtual pixel; a forming section for using one of compressed pixels constituting the compressed picture signal as a notable pixel so as to form a prediction tap from the compressed pixels near the notable pixel and the virtual pixel; a predicting section for predicting a prediction value of the original picture signal from the prediction tap and a predetermined prediction coefficient; a second calculating section for calculating a prediction error of a prediction picture signal constituted by the predicted prediction value with respect to the original picture signal; and a correcting section for correcting the pixel value of the compressed pixel constituting the compressed picture signal in accordance with the prediction error.

A picture signal decoding device for decoding a coded picture signal according to the present invention includes: a forming section for using one of compressed pixels constituting the coded picture signal as a notable pixel so as to form a prediction tap from pixels near the notable pixel; and a generating section for generating a pixel value of a restored picture signal from the prediction tap and a predetermined prediction coefficient. The coded picture signal to be decoded is generated by generating a compressed picture signal having a number of pixels smaller than the number of pixels of an original picture signal, assuming a virtual pixel near a compressed pixel of a pixel constituting the original picture signal so as to calculate the pixel value of the virtual pixel from the original picture signal, replacing a part of the pixel value of the compressed pixel with a part of the pixel value of the virtual pixel, using one of compressed pixels constituting the compressed picture signal as a notable pixel so as to form a prediction tap from the compressed pixels near the notable pixel and the virtual pixel, predicting a prediction value of the original picture signal from the prediction tap and a predetermined prediction coefficient, calculating a prediction error of a prediction picture signal constituted by the predicted prediction value with respect to the original picture signal, and correcting the pixel value of the compressed pixel constituting the compressed picture signal in accordance with the prediction error.

A picture signal encoding method for encoding a picture signal according to the present invention includes: a step of generating a compressed picture signal having a number of pixels smaller than the number of pixels of an original picture signal; a step of assuming a virtual pixel near a compressed pixel of a pixel constituting the original picture signal so as to calculate the pixel value of the virtual pixel from the original picture signal; a step of replacing a part of the pixel value of the compressed pixel with a part of the pixel value of the virtual pixel; a step of using one of compressed pixels constituting the compressed picture signal as a notable pixel so as to form a prediction tap from the compressed pixels near the notable pixel and the virtual pixel; a step of predicting a prediction value of the original picture signal from the prediction tap and a predetermined prediction coefficient; a step of calculating a prediction error of a prediction picture signal constituted by the predicted prediction value with respect to the original picture signal; and a step of correcting the pixel value of the compressed pixel constituting the compressed picture signal in accordance with the prediction error.

A picture signal decoding method for decoding a coded picture signal according to the present invention includes: a step of using one of compressed pixels constituting the coded picture signal as a notable pixel so as to form a prediction tap from pixels near the notable pixel; and a step of generating a pixel value of a restored picture signal from the prediction tap and a predetermined prediction coefficient. The coded picture signal to be decoded is generated by generating a compressed picture signal having a number of pixels smaller than the number of pixels of an original picture signal, assuming a virtual pixel near a compressed pixel of a pixel constituting the original picture signal so as to calculate the pixel value of the virtual pixel from the original picture signal, replacing a part of the pixel value of the compressed pixel with a part of the pixel value of the virtual pixel, using one of compressed pixels constituting the compressed picture signal as a notable pixel so as to form a prediction tap from the compressed pixels near the notable pixel and the virtual pixel, predicting a prediction value of the original picture signal from the prediction tap and a predetermined prediction coefficient, calculating a prediction error of a prediction picture signal constituted by the predicted prediction value with respect to the original picture signal, and correcting the pixel value of the compressed pixel constituting the compressed picture signal in accordance with the prediction error.

On a recording medium decodable by a machine according to the present invention, a recording signal is recorded. The recording signal is generated by generating a compressed picture signal having a number of pixels smaller than the number of pixels of an original picture signal, assuming a virtual pixel near a compressed pixel of a pixel constituting the original picture signal so as to calculate the pixel value of the virtual pixel from the original picture signal, replacing a part of the pixel value of the compressed pixel with a part of the pixel value of the virtual pixel, using one of compressed pixels constituting the compressed picture signal as a notable pixel so as to form a prediction tap from the compressed pixels near the notable pixel and the virtual pixel, predicting a prediction value of the original picture signal from the prediction tap and a predetermined prediction coefficient, calculating a prediction error of a prediction picture signal constituted by the predicted prediction value with respect to the original picture signal, and correcting the pixel value of the compressed pixel constituting the compressed picture signal in accordance with the prediction error.

BEST MODE FOR CARRYING OUT THE INVENTION

Preferred embodiments of the present invention will now be described in detail with reference to the drawings.

Figure 5:
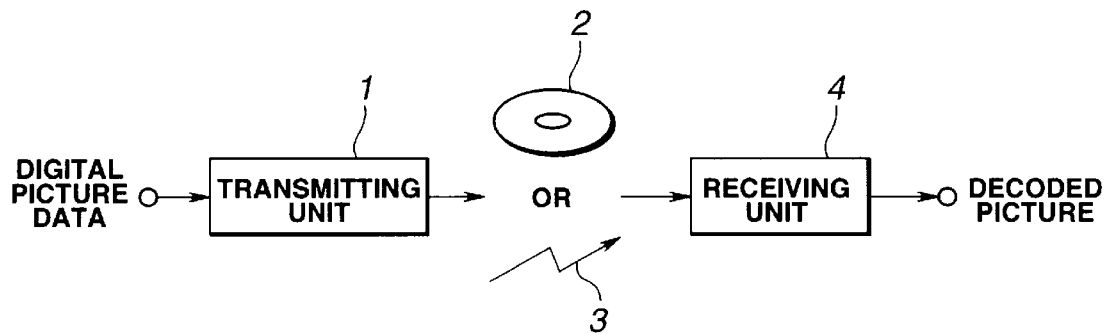
FIG. 5 is a block diagram showing the structure of an embodiment of a picture processing device according to the present invention.

FIG. 5 shows the structure of an embodiment of a picture processing device according to the present invention. A transmitting unit 1 is supplied with picture data of a digitized HD picture. The transmitting unit 1 codes the input picture data by thinning (i.e., reducing the number of pixels of) the input picture data, so as to compress the picture. The transmitting unit 1 records picture data of an SD picture thus obtained, as coded data of the HD picture, onto a recording medium 2 such as an optical disc, a magneto-optical disc, a magnetic tape or the like, or transmits the picture data by ground waves or through a transmission line 3 such as a satellite circuit, a telephone line, a CATV network or the like.

A receiving unit 4 is supplied with the coded data reproduced from the recording medium 2, or receives the coded data transmitted through the transmission line 3. The receiving unit 4 then decodes and expands the coded data, and supplies a decoded picture of the HD picture thus obtained to a display, not shown, so as to display the decoded picture.

The picture processing device as described above is applied to a device for carrying out picture recording/reproduction such as an optical disc device, a magneto-optical disc device, a magnetic tape device or the like, or a device for transmitting pictures such as a video telephone device, a television broadcasting system, a CATV system or the like. Since the transmitting unit 1 outputs the coded data of a small data quantity, as later described, the picture processing device of FIG. 5 is also applicable to a portable terminal having a low transmission rate, for example, a portable telephone unit or the like.

Figure 6:
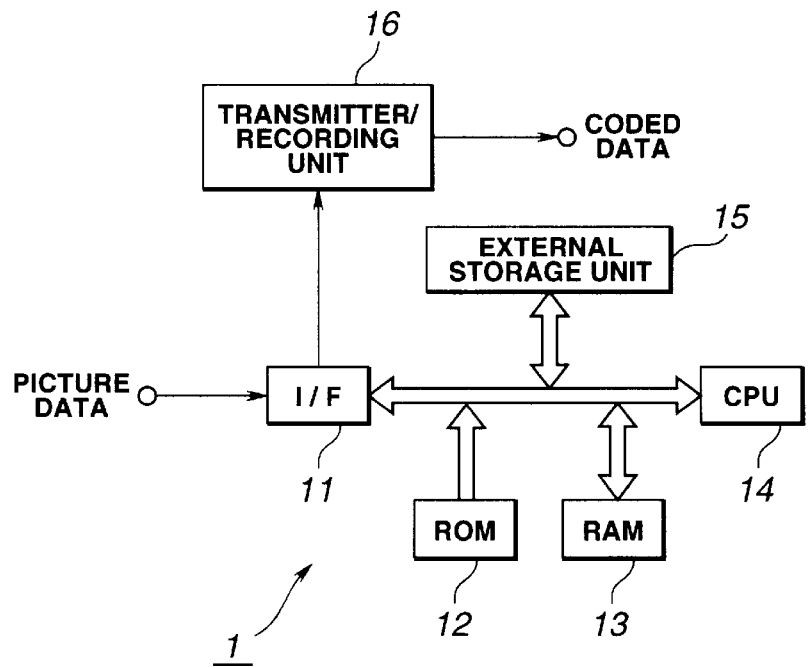
FIG. 6 is a block diagram showing an example of the structure of a transmitting unit 1 of FIG. 5.

FIG. 6 shows an example of the structure of the transmitting unit 1. An interface (I/F) 11 is adapted for receiving picture data of an HD picture supplied from outside and for transmitting coded data to a transmitter/recording unit 16. A ROM (read only memory) 12 stores an IPL (initial program loading) program and the like. A RAM (random access memory) 13 is adapted for storing a system program (operating system or OS) and application program recorded in an external storage unit 15 and for storing data necessary for operation of a CPU (central processing unit) 14. The CPU 14 expands the system program and the application program from the external storage unit 15 to the RAM 13 in accordance with the IPL program stored on ROM 12, and executes the application program under the control of the system program, thereby carrying out coding processing as later described with respect to the picture data supplied from the I/F 11. The external storage unit 15 is constituted by, for example, a magnetic disk unit, and stores the data necessary for operation of the CPU 14 as well as the system program and application program executed by the CPU 14, as described above. The transmitter/recording unit 16 records the coded data supplied from the I/F 11 onto the recording medium 2, or transmits the coded data through the transmission line 3.

The I/F 11, the ROM 12, the RAM 13, the CPU 14 and the external storage unit 15 are interconnected through a bus. Although the transmitting unit 1 in FIG. 6 uses the CPU 14, it may also be constituted by a hard-wired logic circuit.

In the transmitting unit 1 thus constituted, when picture data of an HD picture is supplied to the I/F 11, the picture data is supplied to the CPU 14. The CPU 14 codes the picture data and supplies an SD picture as coded data thus obtained to the I/F 11. On receiving the coded data, the I/F 11 supplies the coded data to the transmitter/recording unit 16. The transmitter/recording unit 16 records the coded data from the I/F 11 onto the recording medium 2, or transmits the coded data through the transmission line 3.

Figure 7:
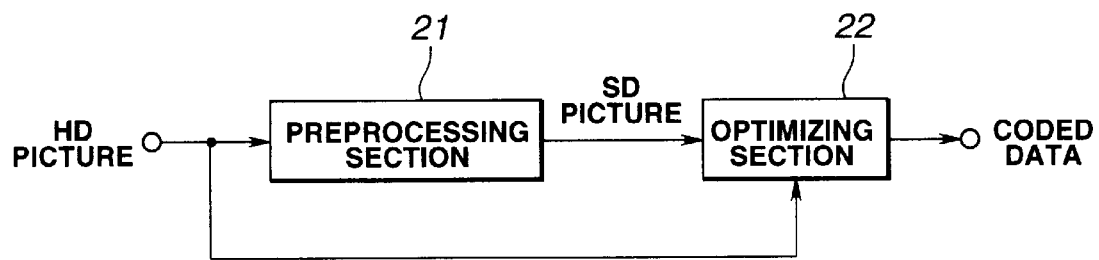
FIG. 7 is a block diagram showing an example of the functional structure of the transmitting unit 1 of FIG. 6.

FIG. 7 is a functional block diagram showing portions of the transmitting unit 1 of FIG. 6, except for the transmitter/recording unit 16.

The HD picture as picture data to be coded is supplied to the preprocessing section 21, and the optimizing section 22. The preprocessing section 21 compresses the HD picture (original picture) by reducing the number of pixels thereof, and assumes a virtual pixel near an SD pixel constituting an SD picture (compressed picture) thus obtained so as to find the pixel value of the virtual pixel from the HD picture. The preprocessing section 21 then allocates a part of the pixel value of the virtual pixel in place of a part of the pixel value of the SD pixel, and supplies the result thereof to the optimizing section 22.

The optimizing section 22 carries out optimization processing by sequentially using the SD pixels from the preprocessing section 21 as notable pixels. Specifically, the optimizing section 22 forms a prediction tap from the SD pixels around the notable pixel and the virtual pixel, and finds a prediction value of the original picture by linear combination between the prediction tap and a set of prediction coefficients, thereby carrying out adaptive processing. The optimizing section 22 then calculates a prediction error of the prediction value with respect to the original HD picture, and corrects the pixel value of the notable pixel in accordance with the prediction error. The optimizing section 22 then repeats similar processing until the prediction error becomes a predetermined value or less, by using the corrected pixel value of the notable pixel, and finds the pixel value of the SD pixel as the optimum notable pixel for obtaining the prediction value of the original HD picture.

Also, the optimizing section 22 carries out the foregoing processing using all the SD pixels constituting the SD picture of one frame (or one field) from the preprocessing section 21, as notable pixels, and then carries out adaptive processing using the optimum SD picture thus obtained, thereby finding a set of prediction coefficients for every class for further reducing the prediction error. That is, the optimizing section 22 updates the set of prediction coefficients for every class by using the optimum SD picture so that the prediction error is further reduced. The optimizing section 22 repeats the optimization processing using the set of prediction coefficients for every class. Then, when the absolute value sum of the prediction error for one frame becomes not more than a predetermined threshold value, or when the set of prediction coefficients for every class is updated for a predetermined number of times, the optimum SD picture and the set of prediction coefficients provided at that time are outputted as coded data as the result of coding of the HD picture.

Figure 8:
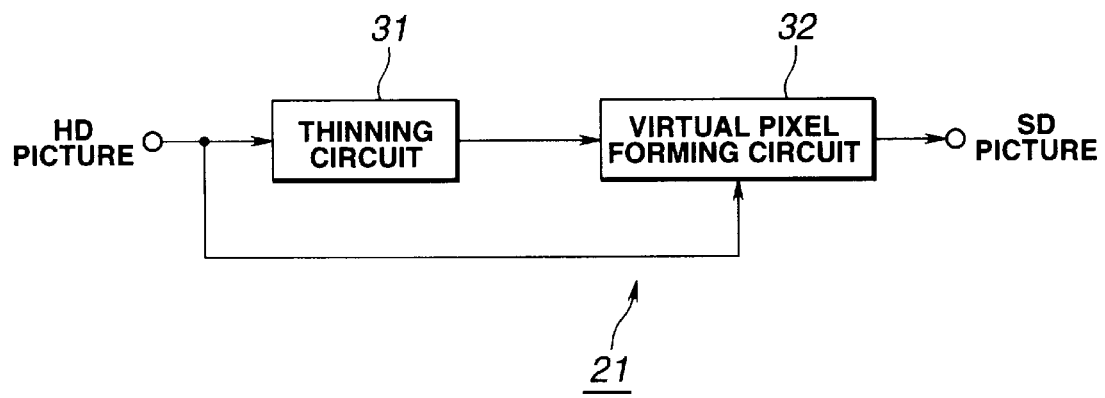
FIG. 8 is a block diagram showing an example of the structure of a preprocessing section 21 of FIG. 7.

FIG. 8 shows an example of the structure of the preprocessing section 21 of FIG. 7.

Figure 9A:
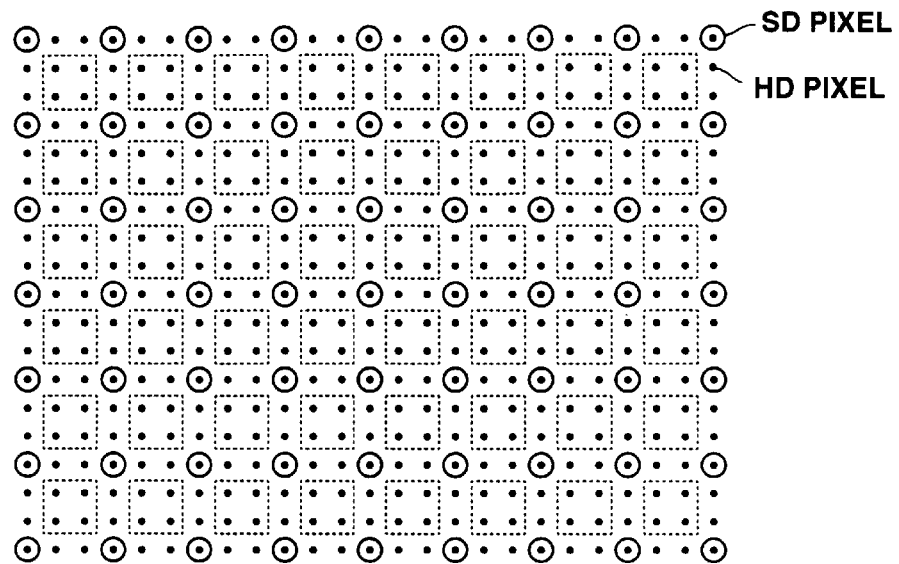
FIGS. 9A and 9B are views for explaining the processing of a thinning circuit 31 of FIG. 8.
Figure 9B:
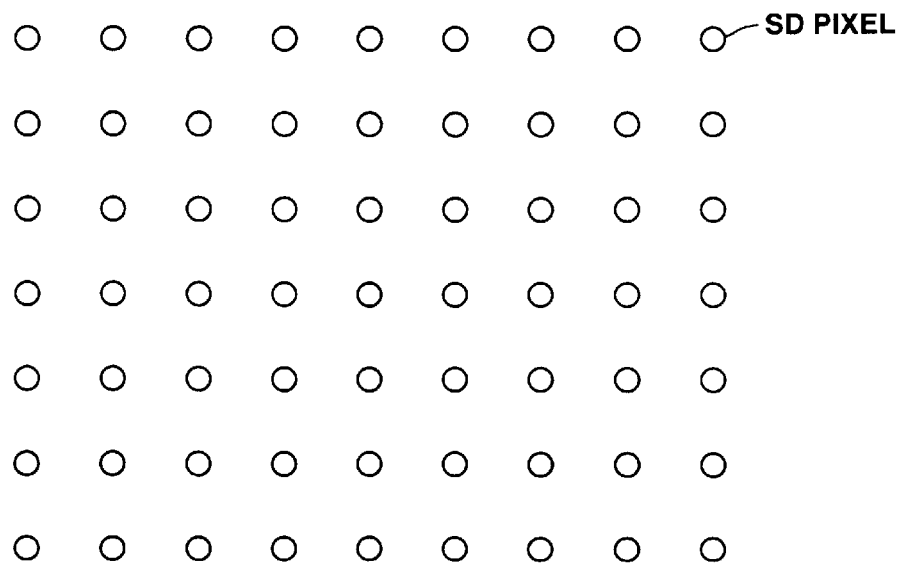

The HD picture to be coded is supplied to a thinning circuit 31 and a virtual pixel forming circuit 32. The thinning circuit 31 reduces the number of pixels of the HD picture by thinning so as to form an SD picture, and supplies the SD picture to the virtual pixel forming circuit 32. Specifically, the thinning circuit 31 divides the HD picture into square blocks consisting of three horizontal pixels × three vertical pixels, that is, nine pixels, and uses the average value of several pixels (as later described) of the individual blocks as the pixel value of the center pixel, thereby forming the SD picture. Thus, the thinning circuit 31 forms the SD picture consisting of SD pixels indicated by ○ in FIG. 9B from the HD picture consisting of HD pixels indicated by • in FIG. 9A by thinning the HD picture to 1/9.

Also, the thinning circuit 31 may extract only the center pixel of the above-described blocks so as to form the SD picture.

The virtual pixel forming circuit 32 assumes a virtual pixel near an SD pixel constituting the SD picture from the thinning circuit 31 so as to find the pixel value of the virtual.

pixel from the HD picture. Specifically, the virtual pixel forming circuit 32 assumes, for example, virtual pixels indicated by ⊚ in FIG. 10 at upper left, lower left, upper right and lower right positions of SD pixels indicated by ○ in FIG. 10. Then, the virtual pixel forming circuit 32 finds an average value of the pixel values of, for example, four HD pixels (indicated by rectangles of dotted lines in FIG. 9A) corresponding to the positions of the virtual pixels, and uses this average value as the pixel value of the virtual pixels.

In addition, the virtual pixel forming circuit 32 causes one virtual pixel to correspond to one SD pixel, and allocates a part of the pixel value of the corresponding virtual pixel in place of a part of the pixel value of the SD pixel. Specifically, if the pixel value of the HD pixel is expressed by eight bits, the pixel value of the SD pixel and the virtual pixel as the average value thereof may also be expressed by eight bits. In this case, the virtual pixel forming circuit 32 allocates the most significant bit (MSB) of the pixel value of the virtual pixel in place of four bits on the least significant bit (LSB) side of the pixel value of the SD pixel. In short, the four bits taken out from the SD pixel are allocated on the MSB side while the four bits taken out from the virtual pixel are allocated on the LSB side so as to form data of eight bits, and this data is used as the pixel value of the SD pixel.

The SD picture constituted by such SD pixels is supplied to the optimizing section 22 (FIG. 7).

Figure 12:
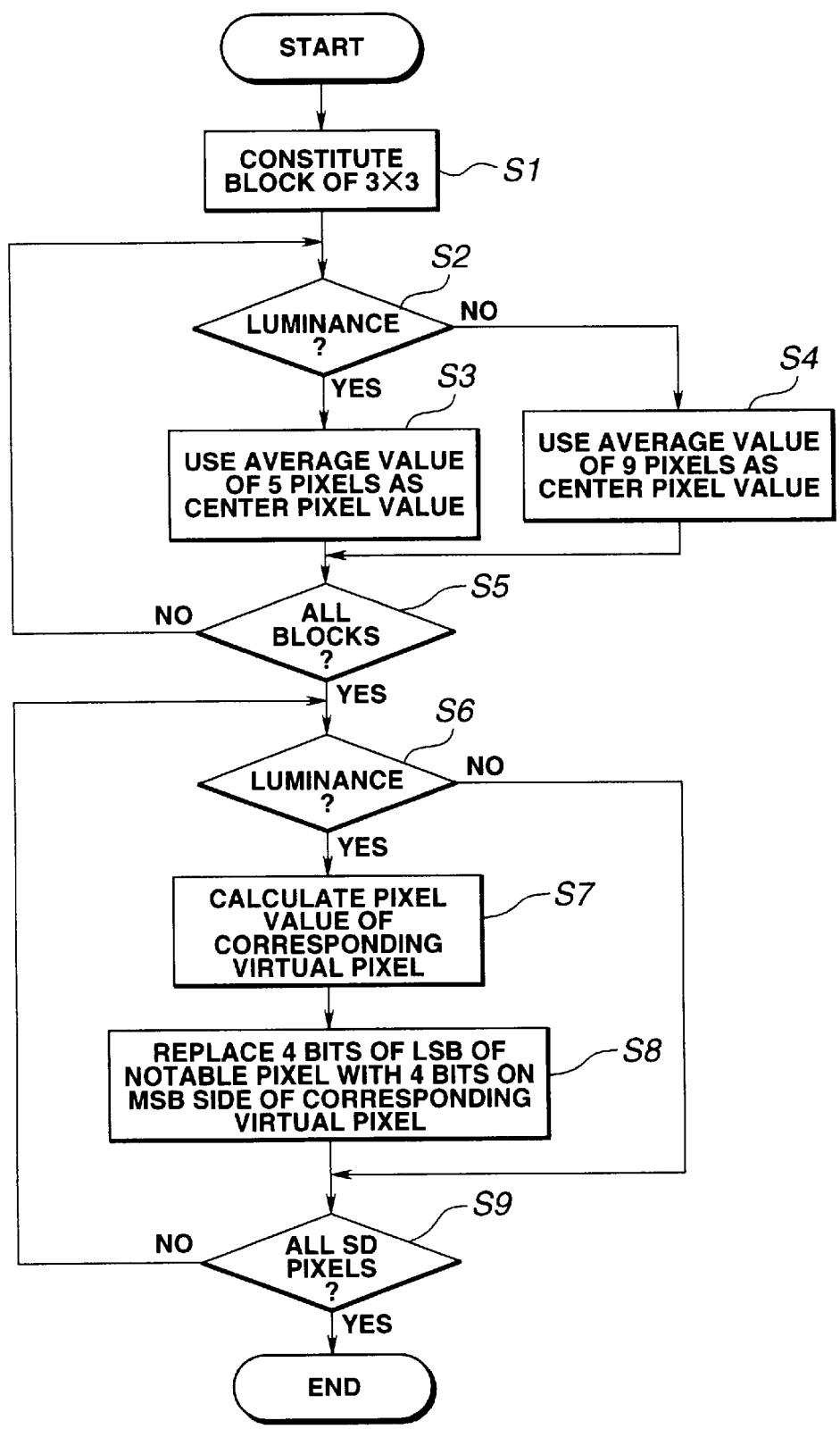
FIG. 12 is a flowchart for explaining the operation of the preprocessing section 21 of FIG. 8.

Referring to the flowchart of FIG. 12, the operation of the preprocessing section 21 will now be described.

When the HD picture to be coded is inputted to the preprocessing section 21, the HD picture is supplied to the thinning circuit 31 and the virtual pixel forming circuit 32. On receiving the HD picture, the thinning circuit 31 thins the number of pixels of the HD picture to form an SD picture.

Specifically, at step S1, the thinning circuit 31 divides the HD picture into blocks of the HD picture consisting of 3×3 pixels, and the operation proceeds to step S2. In this embodiment, on the assumption that the HD picture includes a luminance signal Y and color-difference signals U, V, blocks of the luminance signal and blocks of the color-difference signals are formed at step S1.

At step S2, one of the blocks is used as a notable block, and it is decided whether or not the notable block is a block of the luminance signal. If it is a block of the luminance signal (YES), the operation proceeds to step S3. If it is not (NO), the operation proceeds to step S4.

At step S3, the thinning circuit 31 calculates an average value of pixel values of five HD pixels located in a cross-shaped range crossing at the center HD pixel, included in the notable block, and uses the average value as the pixel value of the center pixel (SD pixel) of the notable block. The operation then proceeds to step S5.

On the other hand, if it is decided at step S2 that the notable block is not a block of the luminance signal, that is, if the notable block is a block of the color-difference signal, the thinning circuit 31 at step S4 calculates an average value of pixel values of 3×3 HD pixels constituting the notable block, and uses the average value as the pixel value of the center pixel (SD pixel) of the notable block. The operation then proceeds to step S5.

At step S5, the thinning circuit 31 decides whether or not all the blocks formed at step S1 have been processed as notable blocks. If all the blocks have been processed as notable blocks, the operation proceeds to step S6. If not, the operation returns to step S2, where similar processing is repeated by newly using blocks, not used as notable blocks, as notable blocks. If the thinning circuit 31 decides at step S5 that all the blocks have been processed as notable blocks, that is, if the SD picture is formed, the thinning circuit 31 supplies the SD picture to the virtual pixel forming circuit 32.

At step S6, the virtual pixel forming circuit 32, supplied with the SD picture from the thinning circuit 31, uses one of the SD pixels constituting the SD picture as a notable pixel, and decides whether the notable pixel is of the luminance signal or not. If the notable pixel is of the luminance signal, the operation proceeds to step S7. If not, the operation proceeds to step S9.

At step S7, the virtual pixel forming circuit 32 finds the pixel value of the virtual pixel corresponding to the notable pixel from the HD pixel as described above, and the operation proceeds to step S8. At step S8, the virtual pixel forming circuit 32 allocates four bits on the MSB side of the pixel value of the corresponding virtual pixel in place of four bits on the LSD side of the pixel value of the notable pixel, as described with reference to FIG. 11. The operation then proceeds to step S9.

At step S9, the virtual pixel forming circuit 32 decides whether or not all the SD pixels have been processed as notable pixels. If all the SD pixels have been processed as notable pixels, the processing ends. If not, the operation returns to step S6, and similar processing is repeated by newly using SD pixels, not used as notable pixels, as notable pixels. That is, if it is decided at step S9 that all the SD pixels have been processed as notable pixels, the virtual pixel forming circuit 32 outputs the SD picture constituted by the SD pixels such that the four bits on the LSB side of the pixel value are replaced with the four bits on the MSB side of the pixel value of the virtual pixel, to the optimizing section 22 (FIG. 7). Then, the processing ends.

The preprocessing section 21 repeats the above-described processing, for example, on the basis of one frame.

In this embodiment, the virtual pixels are formed only for the luminance signal, and a prediction tap constituted only by the SD pixels is used for the color-difference signal. Therefore, since replacement with the four bits on the MSB side of the pixel value of the virtual pixel is carried out only for the luminance signal, and such replacement is not carried out with respect to the color-difference signal.

Figure 13:
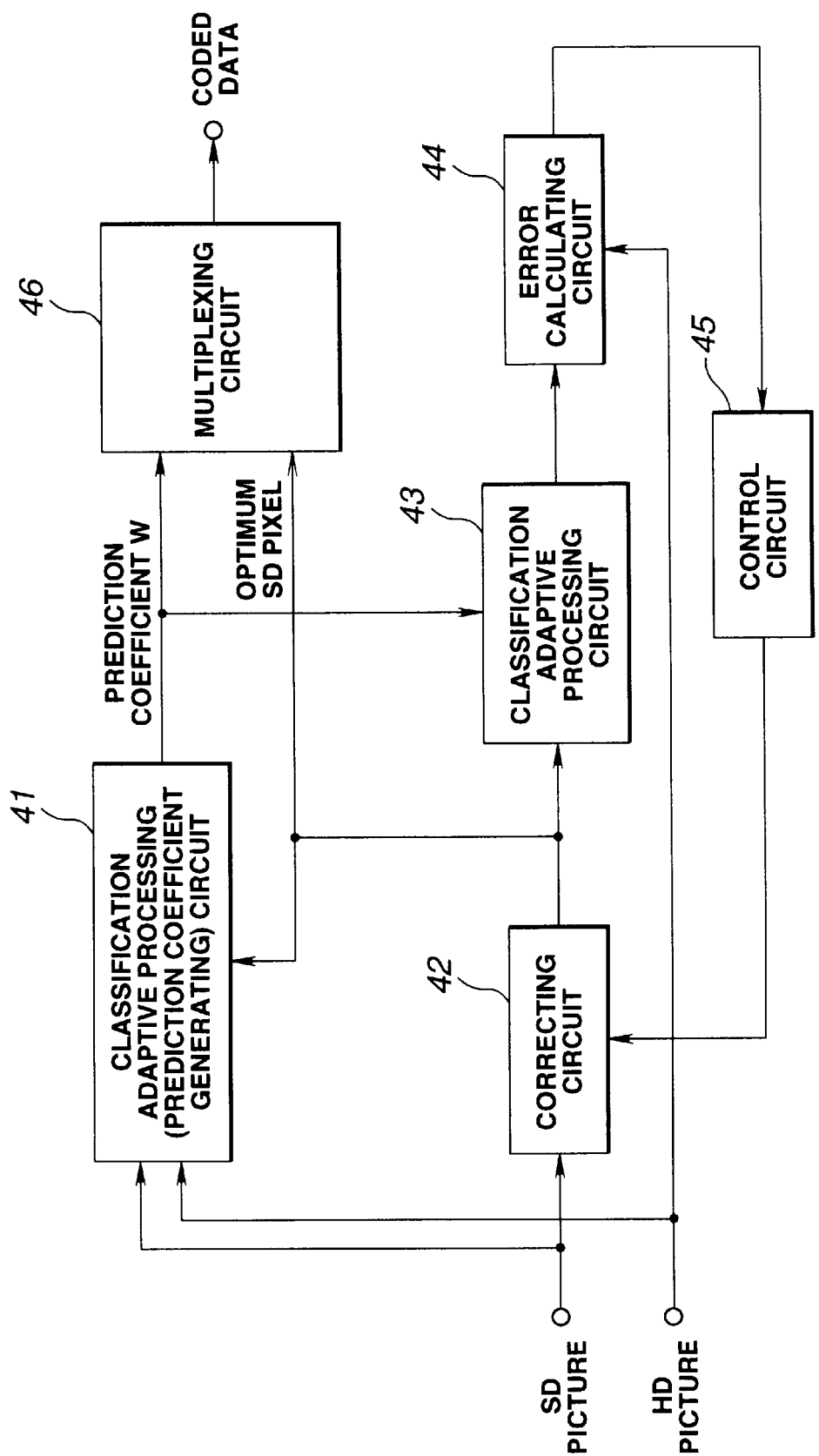
FIG. 13 is a block diagram showing an example of the structure of an optimizing section 22 of FIG. 7.

FIG. 13 shows an example of the structure of the optimizing section 22 of FIG. 7.

The SD picture from the virtual pixel forming circuit 32 in the preprocessing section 21 is supplied to a classification adaptive processing (prediction coefficient generating) circuit 41 and a correcting circuit 42. The HD picture is supplied to the classification adaptive processing (prediction coefficient generating) circuit 41 and an error calculating circuit 44.

When supplied with the HD picture and with the SD picture from the preprocessing section 21, the classification adaptive processing (prediction coefficient generating) circuit 41 carries out adaptive processing for every class using the HD picture and the SD picture, thereby calculating a set of prediction coefficients w for every class. The classification adaptive processing (prediction coefficient generating) circuit 41 outputs the set of prediction coefficients to a classification adaptive processing circuit 43 and a multiplexing circuit 46.

Figure 3:
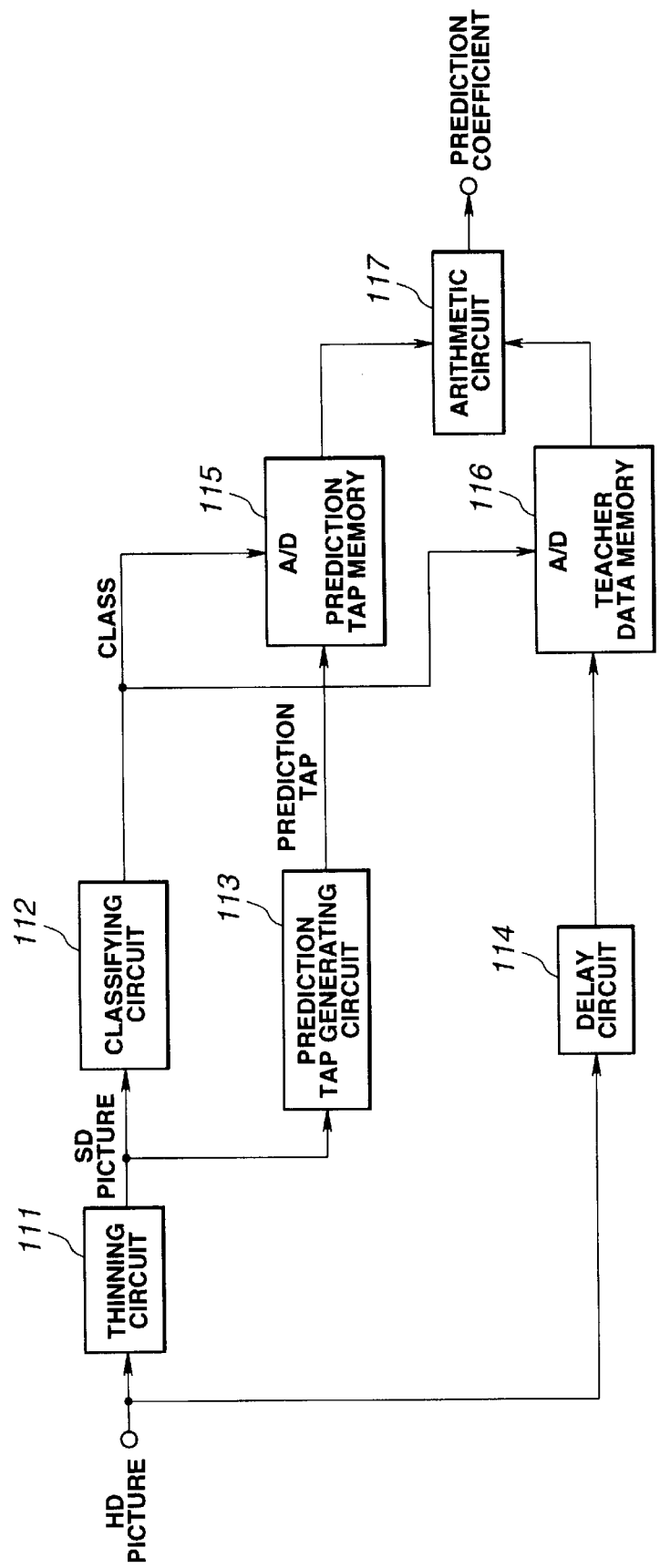
FIG. 3 is a block diagram showing an example of the structure of a learning device (learning circuit) previously proposed by the present Assignee.
Figure 4:
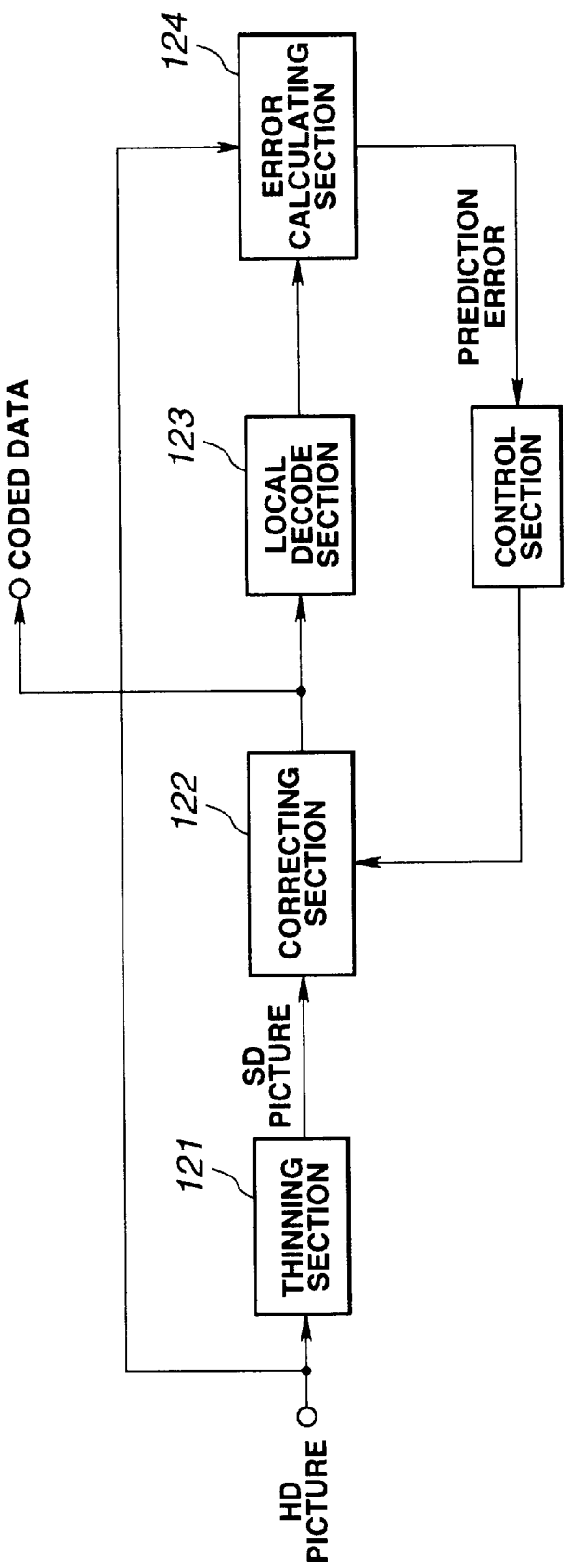
FIG. 4 is a block diagram showing an example of the structure of a picture signal encoding device previously proposed by the present Assignee.
Figure 14:
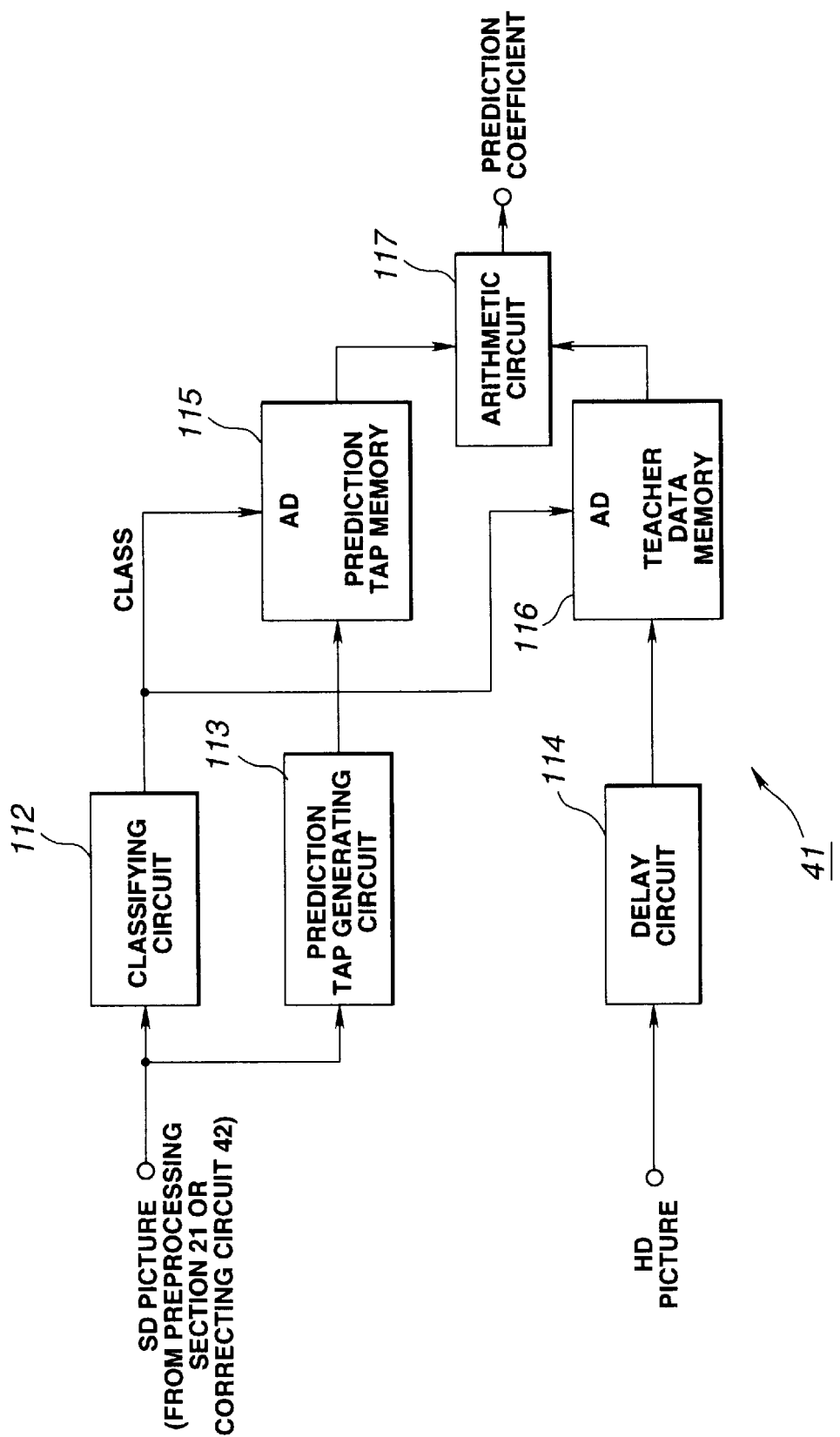
FIG. 14 is a block diagram showing an example of the structure of a classification adaptive processing (prediction coefficient generating) circuit 41 of FIG. 13.

FIG. 14 shows an example of the structure of the classification adaptive processing (prediction coefficient generating) circuit 41. In FIG. 14, portions corresponding to those of the learning device of FIG. 3 are denoted by the same numerals. That is, this classification adaptive processing (prediction coefficient generating) circuit 41 have a structure basically the same as that of the learning device of FIG. 3, except that the thinning circuit 111 is not provided. However, the classifying circuit 112 and the prediction coefficient tap generating circuit 113 are supplied with the SD picture from the preprocessing section 21 or the correcting circuit 42. The delay circuit 114 is supplied with the same HD picture as the HD picture supplied to the preprocessing section 21. Thus, the operation with respect to class tap formation and prediction tap formation as later described differs. The operation of the classification adaptive processing (prediction coefficient generating) circuit 41 will be described later.

Referring to FIG. 13 again, the correcting circuit 42 corrects the pixel value of the SD pixel constituting the SD picture under the control of a control circuit 45, and outputs the corrected pixel value to the classification adaptive processing (prediction coefficient generating) circuit 41, the classification adaptive processing circuit 43 and the multiplexing circuit 46. The classification adaptive processing circuit 43 carries out adaptive processing using the SD pixel supplied from the correcting circuit 42 and the set of prediction coefficients w for every class supplied from the classification adaptive processing (prediction coefficient generating) circuit 41, thereby finding the prediction value of the HD pixel. The classification adaptive processing circuit 43 supplies the prediction value of the HD pixel to the error calculating circuit 44.

Figure 1:
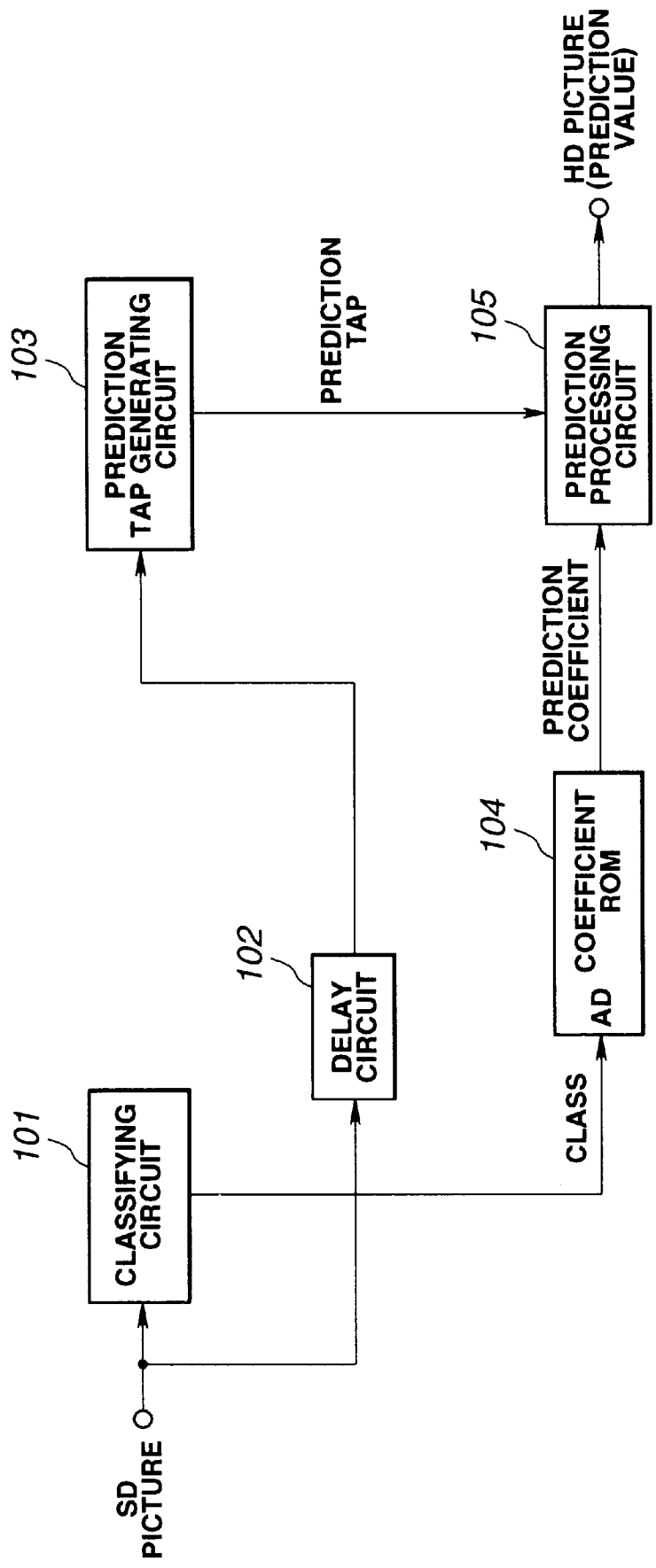
FIG. 1 is a block diagram showing an example of the structure of a picture converting device (picture converting circuit) previously proposed by the present Assignee.
Figure 15:
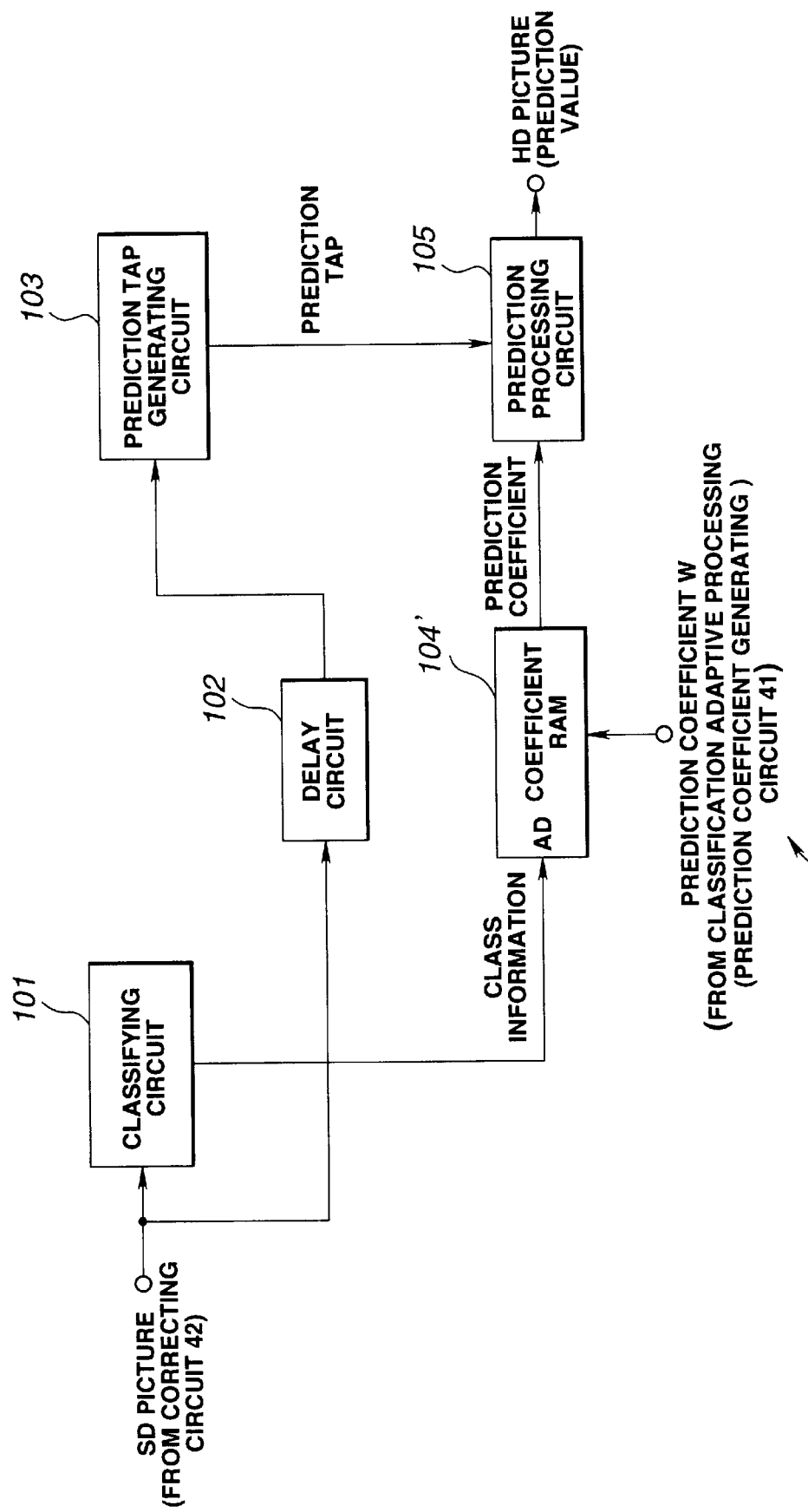
FIG. 15 is a block diagram showing an example of the structure of a classification adaptive processing circuit 43 of FIG. 13.

FIG. 15 shows an example of the structure of the classification adaptive processing circuit 43. Portions corresponding to those of the picture converting device of FIG. 1 are denoted by the same numerals. That is, the classification adaptive processing circuit 43 has a structure basically the same as that of the picture converting device of FIG. 1, except that a coefficient RAM 104' which enables rewrite of the set of prediction coefficients w for every class is provided in place of the coefficient ROM 104. In this coefficient RAM 104', the set of prediction coefficients W for every class supplied from the classification adaptive processing (prediction coefficient generating) circuit 41 of FIG. 13 is stored. Also, the operation with respect to class tap formation and prediction tap formation differs from that of the picture converting device of FIG. 1. The operation of the classification adaptive processing circuit 43 will be described later.

Referring to FIG. 13 again, the error calculating circuit 44 calculates a prediction error of the prediction value of the HD pixel from the classification adaptive processing circuit 43 with respect to the true pixel value of the HD pixel, and outputs the prediction error to the control circuit 45. The control circuit 45 controls the correction quantity of the pixel value of the SD pixel in the correcting circuit 42 in accordance with the prediction error from the error calculating circuit 44. The multiplexing circuit 46 multiplexes the prediction coefficients w from the classification adaptive processing (prediction coefficient generating) circuit 41 and the corrected pixel value of the SD pixel from the correcting circuit 42, and outputs the multiplexing result as coded data.

Figure 16:
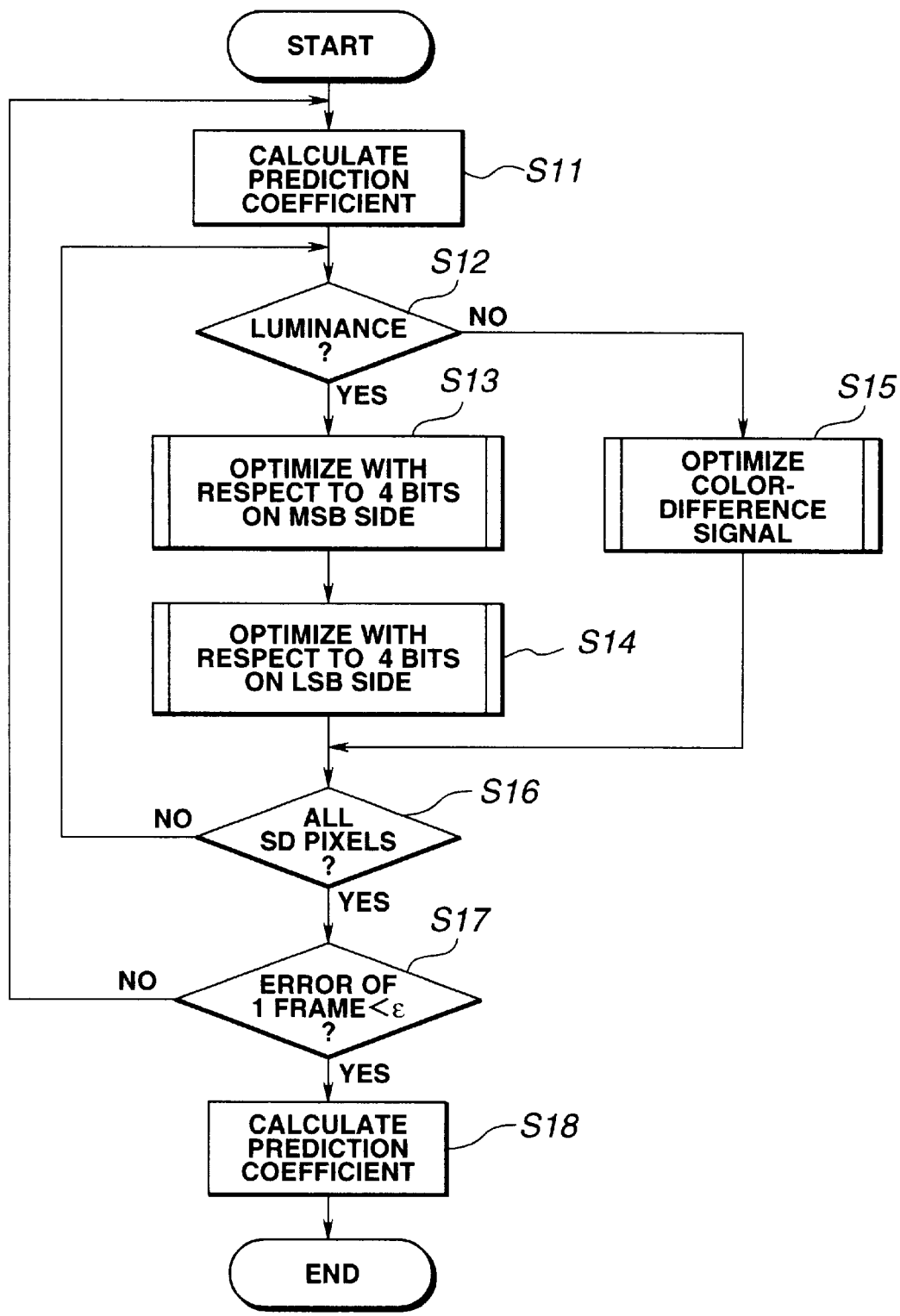
FIG. 16 is a flowchart for explaining the operation of the optimizing section 22 of FIG. 13.

Referring to the flowchart of FIG. 16, the operation of the optimizing section 22 will now be described.

At step S11, on receiving the SD picture from the preprocessing section 21, the classification adaptive processing (prediction coefficient generating) circuit 41 carries out adaptive processing using the SD picture and the HD picture, thereby calculating a set of prediction coefficients w for every class.

Specifically, the classification adaptive processing (prediction coefficient generating) circuit 41 sequentially uses the SD pixels constituting the SD picture as notable pixels, and forms taps for classification (hereinafter referred to as class tap) with respect to the notable pixels, thus carrying out classification. In this embodiment, class taps as follows are formed with respect to the notable pixels so as to carry out classification.

Figure 17A:
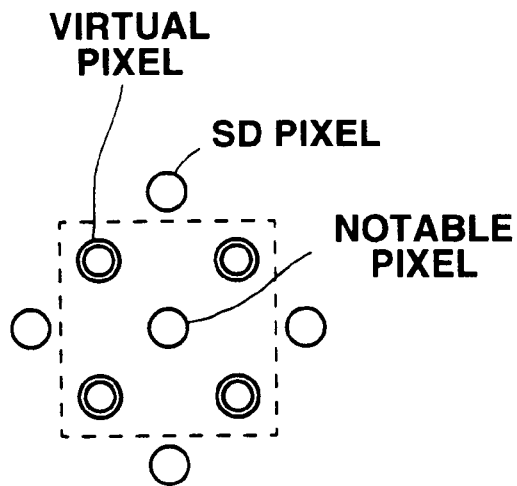
FIGS. 17A and 17B are views showing a class tap formed at the time when the classification adaptive processing (prediction coefficient generating) circuit 41 of FIG. 13 carries out classification.

That is, with respect to the luminance signal, a class tap is formed by five SD pixels and four virtual pixels, that is, nine pixels in total, in a trapezoidal range centering the notable pixel, as shown in FIG. 17A. Then, the difference between the maximum value and the minimum value of the pixel values of the nine pixels is employed as a dynamic range DR, and by using this dynamic range DR, one-bit ADRC processing is carried out on the notable pixel and the four virtual pixels adjacent thereto, that is, five pixels in total (surrounded by a dotted line in FIG. 17A), of the class tap. The pattern of pixel value of the five pixels is used as the class of the notable pixel. Therefore, in this case, since the pattern of pixel value obtained by carrying out one-bit ADRC processing on the five pixels centering the notable pixel is expressed by five bits, the luminance signal is classified into any one of 32 ($=2^5$) classes.

As the pixel value of the virtual pixel, a value obtained by shifting (multiplying by $2^4$) the four bits on the LSB side of the pixel value of the SD pixel corresponding to the virtual pixel leftward by four bits and then adding 8 ($=2^3$), for example, is used. However, as the pixel value of the virtual pixel, a value obtained by shifting the four bits on the LSB side of the pixel value of the SD pixel leftward by four bits may be used, or a value obtained by shifting the four bits on the LSB side of the pixel value of the SD pixel leftward by four bits and then adding a value not smaller than 0 and smaller than 16 ($=2^4$) other than 8 may also be used.

Figure 11:
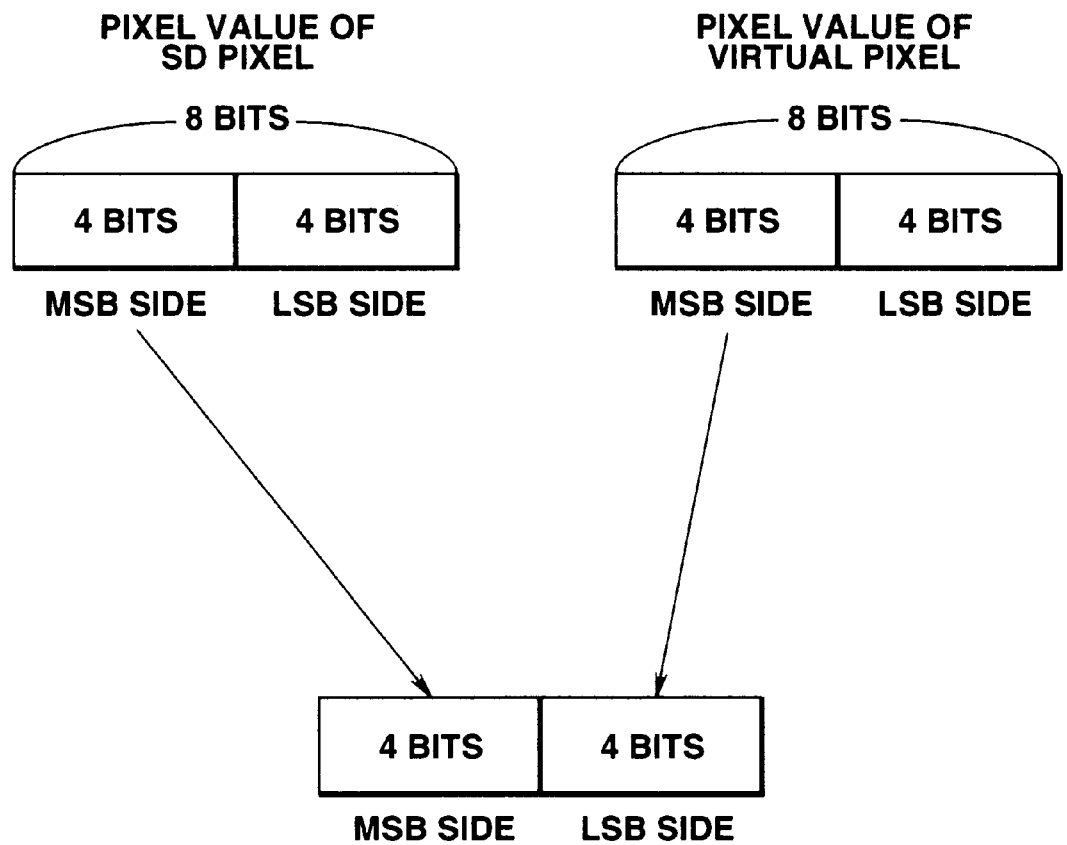
FIG. 11 is a view for explaining the processing of the virtual pixel forming circuit 32 of FIG. 8.

With respect to the pixel value of the SD pixel, as described with reference to FIG. 11, the four bits on the LSB side are the four bits on the MSB side of the pixel value of the corresponding virtual pixel. The value of the eight bits may be used as the pixel value of the SD pixel. However, as the pixel value of the SD pixel, a value obtained by replacing the four bits on the LSB side with a randomly generated value not smaller than 0 and smaller than 16 ($=2^4$) may also be used.

Figure 17B:
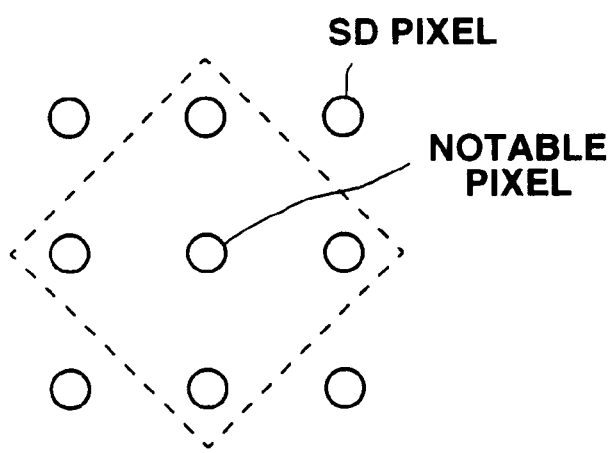

On the other hand, with respect to the color-difference signal, a class tap is formed by nine SD pixels in a square range centering the notable pixel, as shown in FIG. 17B. The difference between the maximum value and the minimum value of the pixel values of the nine pixels is employed as a dynamic range DR, and by using this dynamic range DR, one-bit ADRC processing is carried out on five SD pixels (surrounded by a dotted line in FIG. 17B) in a trapezoidal range centering the notable pixel. Then, the pattern of pixel value of the five pixels is used as the class of the notable pixel. Therefore, in this case, since the pattern of pixel value obtained by carrying out one-bit ADRC processing on the five pixels centering the notable pixel is expressed by five bits, the color-difference signal is classified into any one of 32 ($=2^5$) classes, similarly to the luminance signal.

Figure 18:
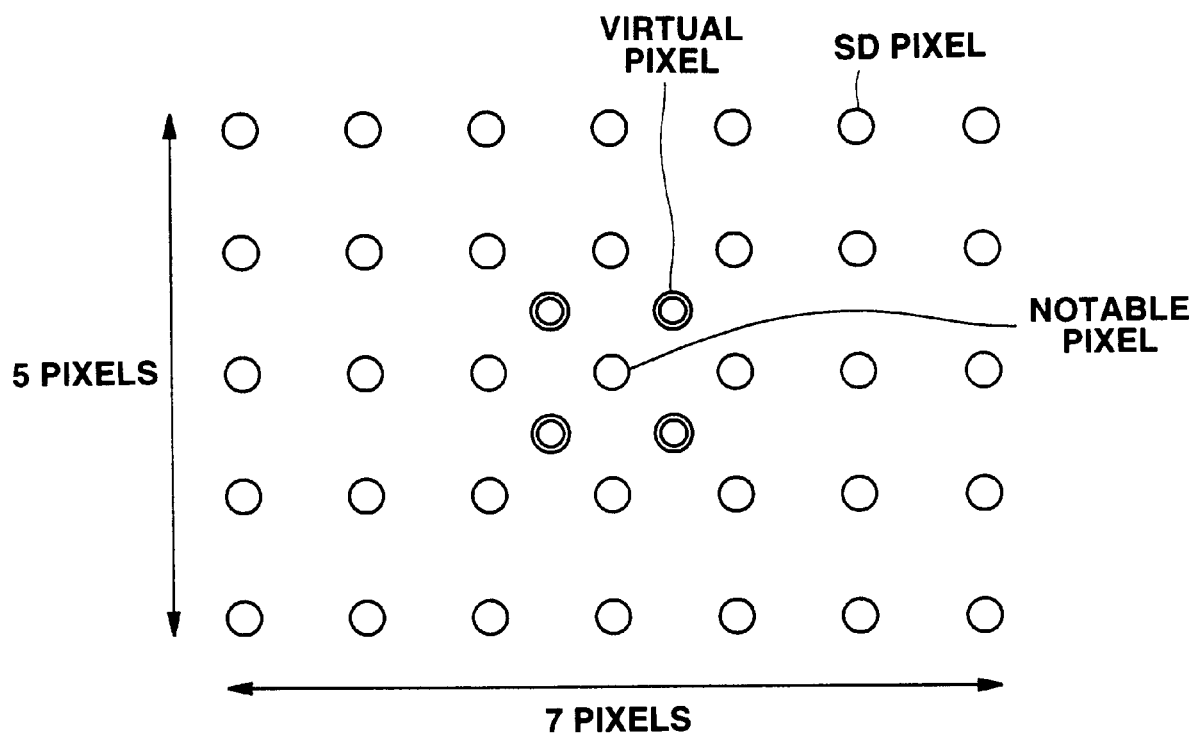
FIG. 18 is a view showing a prediction tap formed at the time when the classification adaptive processing (prediction coefficient generating) circuit 41 of FIG. 13 carries out adaptive processing.

The classification adaptive processing (prediction coefficient generating) circuit 41 thus determines the class of the notable pixel, and then forms a prediction tap. Specifically, if the notable pixel is of the color-difference signal, the classification adaptive processing (prediction coefficient generating) circuit 41 forms a prediction tap by 35 SD pixels (indicated by ○ of solid line or dotted line in FIG. 18)

consisting of 7×5 (longitudinal×lateral) pixels centering the notable pixel, as shown in FIG. 18. If the notable pixel is of the luminance signal, the classification adaptive processing (prediction coefficient generating) circuit 41 forms a prediction tap by 35 SD pixels using the virtual pixels adjacent to the notable pixel in place of the upper left, lower left, upper right and lower right SD pixels (indicated by o in FIG. 18) of the 7×5 pixels.

Figure 2:
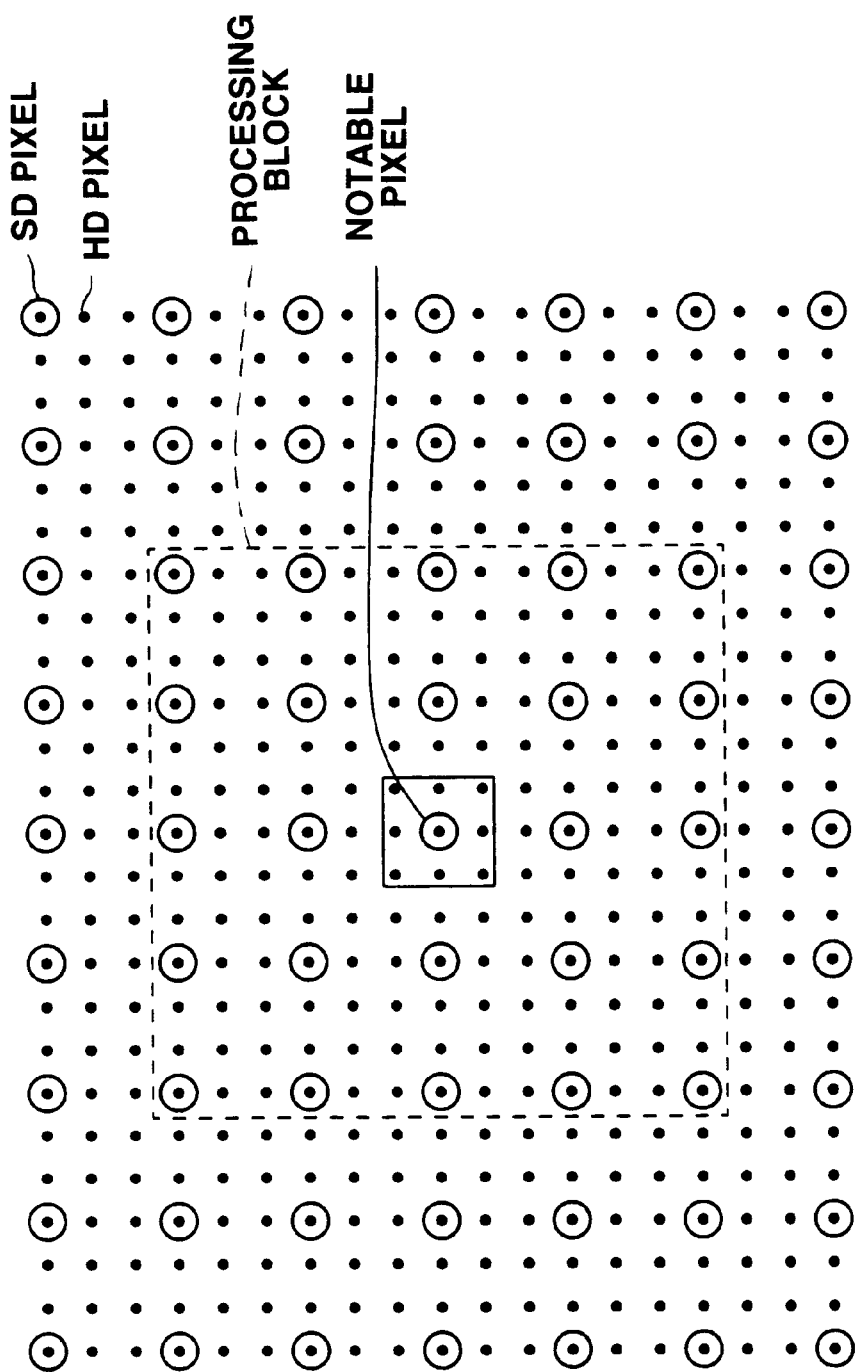
FIG. 2 is a view for explaining the processing of a classifying circuit 101 of FIG. 1.

Then, the classification adaptive processing (prediction coefficient generating) circuit 41 establishes and solves the normal equation of Equation 13 by using the prediction tap and the HD picture for every class, thereby finding a set of prediction coefficients w for every class. In this case, the normal equation is established by using the HD pixels in the positional relation of the range surrounded by the rectangle of solid line in FIG. 2 with respect to the notable pixel. The set of prediction coefficients w for every class found by the classification adaptive processing (prediction coefficient generating) circuit 41 is supplied to the classification adaptive processing circuit 43 and stored in the coefficient RAM 104'.

When the set of prediction coefficients w for every class is found by the classification adaptive processing (prediction coefficient generating) circuit 41, the optimizing section 22 uses one of the SD pixels constituting the SD picture from the preprocessing section 21 as a notable pixel, and decides whether the notable pixel is of the luminance signal or not, at step S12. If the notable pixel is of the luminance signal, the operation proceeds to step S13. If not, the operation proceeds to step S15.

At step S13, the correcting circuit 42, the classification adaptive processing circuit 43, the error calculating circuit 44 and the control circuit 45 carry out optimization processing on the four bits on the MSB side of the pixel value of the notable pixel, and the operation proceeds to step S14. At step S14, the correcting circuit 42, the classification adaptive processing circuit 43, the error calculating circuit 44 and the control circuit 45 carry out optimization processing on the remaining four bits on the LSB side of the pixel value of the notable pixel, and the operation proceeds to step S16.

Meanwhile, if it is decided that the notable pixel is not of the luminance signal, that is, if the notable pixel is of the color-difference signal, the correcting circuit 42, the classification adaptive processing circuit 43, the error calculating circuit 44 and the control circuit 45 carry out optimization processing on the color-difference signal at step S15, and the operation proceeds to step S16.

At step S16, it is decided whether all the SD pixels constituting the SD picture from the preprocessing section 21 have been processed or not. If it is decided that all the SD pixels have not been processed, the operation returns to step S12, where similar processing is repeated by newly using the SD pixels, not used as notable pixels, as notable pixels.

If it is decided at step S16 that all the SD pixels have been processed as notable pixels, the operation proceeds to step S17, where it is decided whether or not the sum of prediction error for one frame of the prediction value of the HD pixel predicted from the SD pixels is equal to or smaller than a predetermined threshold e. If it is decided at step S17 that the sum of prediction error for one frame is not equal to or smaller than the predetermined threshold $\epsilon$, the operation returns to step S11, where processing similar to the above-described processing is repeated. In this case, however, the classification adaptive processing (prediction coefficient generating) circuit 41 uses an optimum SD pixel value, as later described, outputted from the correcting circuit 42 instead of the pixel value of the SD pixel outputted from the preprocessing section 21 at step S11. That is, the optimum SD pixel from the correcting circuit 43 is inputted to the classifying circuit 112 and the prediction tap generating circuit 113 of FIG. 14, so as to find (update) a set of prediction coefficients w for every class by similar processing.

If it is decided at step S17 that the sum of prediction error for one frame is equal to or smaller than the predetermined threshold $\epsilon$, the operation proceeds to step S18. The classification adaptive processing (prediction coefficient generating) circuit 41 calculates a set of prediction coefficients w for every class by using the pixel value of the SD pixel outputted from the correcting circuit 42 at that time. Then, the pixel value of the SD pixel and the set of prediction coefficients w for every class are multiplexed into coded data by the multiplexing circuit 46, and the processing ends.

After that, when an HD picture and an SD picture of the next frame are supplied, the optimizing section 22 carries out similar processing.

The optimization processing on the four bits on the MSB side of the pixel value of the notable pixel at step S13 of FIG. 16 will now be described in detail with reference to the flowchart of FIG. 19.

When the set of prediction coefficients w for every class is found by the classification adaptive processing (prediction coefficient generating) circuit 41 and is supplied to the classification adaptive processing circuit 43, one of the SD pixels constituting the SD picture from the preprocessing section 21 is used as a notable pixel, and at step S31, the control circuit 45 initializes a variable $\Delta$ expressing the correction quantity for correcting the pixel value of the notable pixel to, for example, 0. Also, at step S31, a variable S expressing the change quantity (hereinafter referred to as offset quantity) for changing the correction quantity is set to 16 as an initial value.

In the present case, since the four bits on the MSB side of the pixel value of the notable pixel are the target of processing, the offset quantity S is set to 16 (=$4^2$), which is the minimum value for changing the four bits on the MSB side.

In addition, at step S31, a variable i for counting the number of times of correction of the notable pixel is set to −1 as an initial value, and the operation proceeds to step S32. At step S32, the number of times i makes increment only of 1, and the operation proceeds to step S33. In the case where adaptive processing is carried out using a correction value which is obtained by correcting the pixel value of the notable pixel only by the correction quantity $\Delta$, a prediction error E of the prediction value of the HD pixel affected by the correction is calculated.

In this case, the correcting circuit 42 adds the correction quantity $\Delta$ to the pixel value of the notable pixel, and outputs the addition value as the pixel value of the notable pixel to the classification adaptive processing circuit 43. If the processing of step S33 is first carried out on the notable pixel, that is, if the number of times i=0, the correction quantity $\Delta$ remains as the initial value of 0. Therefore, the correcting circuit 42 directly outputs the pixel value of the notable pixel.

The classification adaptive processing circuit 43 forms the prediction tap shown in FIG. 17 similarly to the classification adaptive processing (prediction coefficient generating) circuit 41, and forms the prediction tap in the form shown in FIG. 18. That is, the prediction tap is formed by the four virtual pixels adjacent to the notable pixel, in place of the upper left, lower left, upper right and lower right SD pixels farthest from the notable pixel from among the 7×5 SD pixels centering the notable pixel.

In addition, the notable pixel is classified in accordance with the class tap, and a set of prediction coefficients corresponding to the class thus obtained is selected from the sets of prediction coefficients supplied from the classification adaptive processing (prediction coefficient generating) circuit 41 and stored in the coefficient RAM 104'. Then, the linear primary formula of Equation 1 is calculated from the selected set of prediction coefficients and the prediction tap, thereby finding the prediction value of the pixel value of the HD pixel.

In addition, in the case where the pixel value of the notable pixel is corrected by the correction quantity Δ, the classification adaptive processing circuit 43 similarly finds the prediction value with respect the HD pixel affected by the correction.

Figure 20:
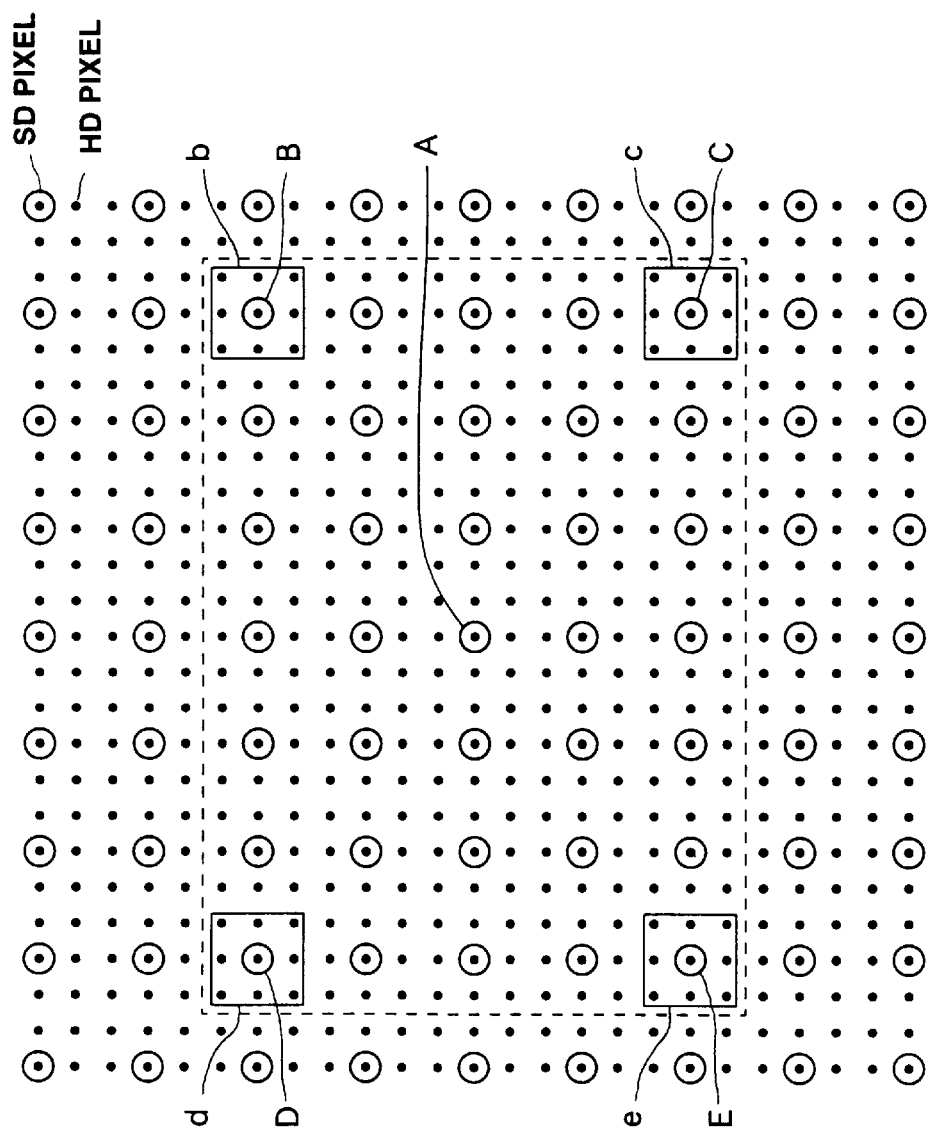
FIG. 20 is a view for explaining the processing of step S33 of FIG. 19.

Specifically, it is now assumed that an SD pixel A is corrected as a notable pixel, as shown in FIG. 20. In this embodiment, the prediction tap is simply constituted by 7×5 SD pixels. When the prediction tap is constituted by such 7×5 SD pixels, the SD pixel A is included in the prediction tap and an SD pixel farthest from the SD pixel A becomes the notable pixel in the case where SD pixels B, C, D and E are used as notable pixels in the prediction tap constituted by 7×5 pixels. In this case where the SD pixels B, C, D and E are used as notable pixels in the prediction tap constituted by 7×5 pixels, in this embodiment, the prediction values of the 3×3 HD pixels in ranges b, c, d and e surrounded by solid lines in FIG. 20 are found, respectively. Therefore, if the pixel value of the SD pixel A as the notable pixel is corrected, the prediction values of 21×15 HD pixels in a range indicated by a dotted line in FIG. 20, which is a minimum rectangle including the ranges b, c, d and e, are affected by the correction in the worst case.

Thus, in this embodiment, the classification adaptive processing circuit 43 finds at least the prediction values of such 21×15 HD pixels.

The prediction value of the HD pixel found by the classification adaptive processing circuit 43 is supplied to the error calculating circuit 44. The error calculating circuit 44 subtracts the true pixel value of the corresponding HD pixel from the prediction value of the HD pixel supplied from the classification adaptive processing circuit 43, and finds the square sum of the prediction error, which is, the subtraction value. This square sum is supplied as error information E to the control circuit 45.

On receiving the error information from the error calculating circuit 44, the control circuit 45 decides whether the number of times i is 0 or not, at step S34. If it is decided at step S34 that the number of times i is 0, that is, if the error information E received by the control circuit 45 is obtained without carrying out correction of the notable pixel, the operation proceeds to step S35. A variable $E_0$ for storing the error information obtained without carrying out correction of the notable pixel (error information at the time of non-correction) is set to the error information E, and a variable E' for storing the previously obtained error information is also set to the error information E. In addition, at step S35, the correction quantity Δ makes increment by the offset quantity S, and the control circuit 45 controls the correcting section 42 to correct the pixel value of the notable pixel only by the correction quantity Δ thus obtained. After that, the operation returns to step S32, and similar processing is repeated.

In this case, since the number of times i makes increment by 1 so as to become 1 at step S32, it is decided at step S34 that the number of times i is not 0, and the operation proceeds to step S36. At step S36, it is decided whether the number of times i is 1 or not. In this case since the number of times i is 1, the operation proceeds to step S37, where it is decided whether or not the previous error information E' is equal to or greater than the current error information E. If it is decided at step S37 that the previous error information E' is not equal to or greater than the current error information E, that is, if the pixel value of the notable pixel is corrected by the correction quantity Δ so as to increase the current error information E to be greater than the previous error information E' (error information in the case where no correction is carried out), the operation proceeds to step S38. The control circuit 45 defines the offset quantity S multiplied by −1 as a new offset quantity S, and makes increment on the correction quantity Δ by twice the offset quantity S. Then, the operation returns to step S32.

Specifically, if the pixel value of the notable pixel is corrected by the correction quantity Δ (in this case, Δ=S), thereby increasing the error in comparison with the case where no correction is carried out, the sign of the offset quantity S is reversed. (In this embodiment, since the offset quantity S is set to a positive value at step S31, the sign of the offset quantity S is reversed from positive to negative at step S38.) In addition, the correction quantity Δ which was previously S is caused to be −S.

On the other hand, if it is decided at step S37 that the previous error information E' is equal to or greater than the current error information E, that is, if the pixel value of the notable pixel is corrected by the correction quantity Δ so as to decrease the current error information E to be smaller than (or equal to) the previous error information E', the operation proceeds to step S39. The control circuit 45 makes increment on the correction quantity Δ by the offset quantity S, and updates the previous error information E' to the current error information E. Then, the operation returns to step S32.

In this case, since the number of times i makes further increment by 1 so as to become 2 at step S32, it is decided at step S34 or S36 that the number of times is not 0 or 1. As a result, the operation proceeds from step S36 to step S40. At step S40, it is decided whether the number of times i is 2 or not. At this point, since the number of times i is 2, it is decided at step S40 that the number of times i is 2. The operation proceeds to step S41, where it is decided whether or not the error information $E_0$ at the time of non-correction is equal to or smaller than the current error information E and whether or not the offset quantity S is negative.

If it is decided at step S41 that the error information $E_0$ at the time of non-correction is equal to or smaller than the current error information E and that the offset quantity S is negative, that is, if the error is increased by correcting the notable pixel by +S or −S in comparison with the case where no correction is carried out, the operation proceeds to step S42, where the correction quantity Δ becomes 0. Then, the operation proceeds to step S46.

On the other hand, if it is decided at step S41 that the error information $E_0$ at the time of non-correction is not equal to or smaller than the current error information E, or that the offset quantity S is not negative, the operation proceeds to step S43, where it is decided whether or not the previous error information E' is equal to or greater than the current error information E. If it is decided at step S43 that the previous error information E' is equal to or greater than the current error information E, that is, if the pixel value of the notable pixel is corrected by the correction quantity Δ so as to decrease the current error information E to be smaller than the previous error information E', the operation proceeds to step S44. The control circuit 45 makes increment on the correction quantity Δ by the offset quantity S, and updates the previous error information E' to the current error information E. Then, the operation returns to step S32.

In this case, since the number of times i makes further increment by 1 so as to become 3 at step S32, it is decided at step S34, S36, or S40 that the number of times is not 0, 1, or 2. As a result, the operation proceeds from step S40 to step S43. At step S43, loop processing of steps S32 to S34, S36, S40, S43 and S44 is repeated until it is decided that the previous error information E' is not equal to or greater than the current error information E.

If it is decided at step S43 that the previous error information E' is not equal to or greater than the current error information E, that is, the pixel value of the notable pixel is corrected by the correction quantity Δ so as to increase the current error information E to be greater than the previous error information E', the operation proceeds to step S45. The control circuit 45 makes decrement on the correction quantity Δ by the offset quantity S, and the operation proceeds to step S46. That is, in this case, the correction quantity Δ has a value prior to the increase in the error.

At step S46, the control circuit 45 controls the correcting circuit 42, thereby correcting the pixel value of the notable pixel by the correction quantity Δ obtained at step S42 or S45. Thus, the pixel value of the notable pixel is corrected to be an optimum pixel value which minimizes the prediction error, for obtaining the prediction value by adaptive processing.

Thus, after the four bits on the MSB side of the pixel value of the notable pixel are optimized for finding the prediction value of the HD picture, the operation returns.

Figure 21:
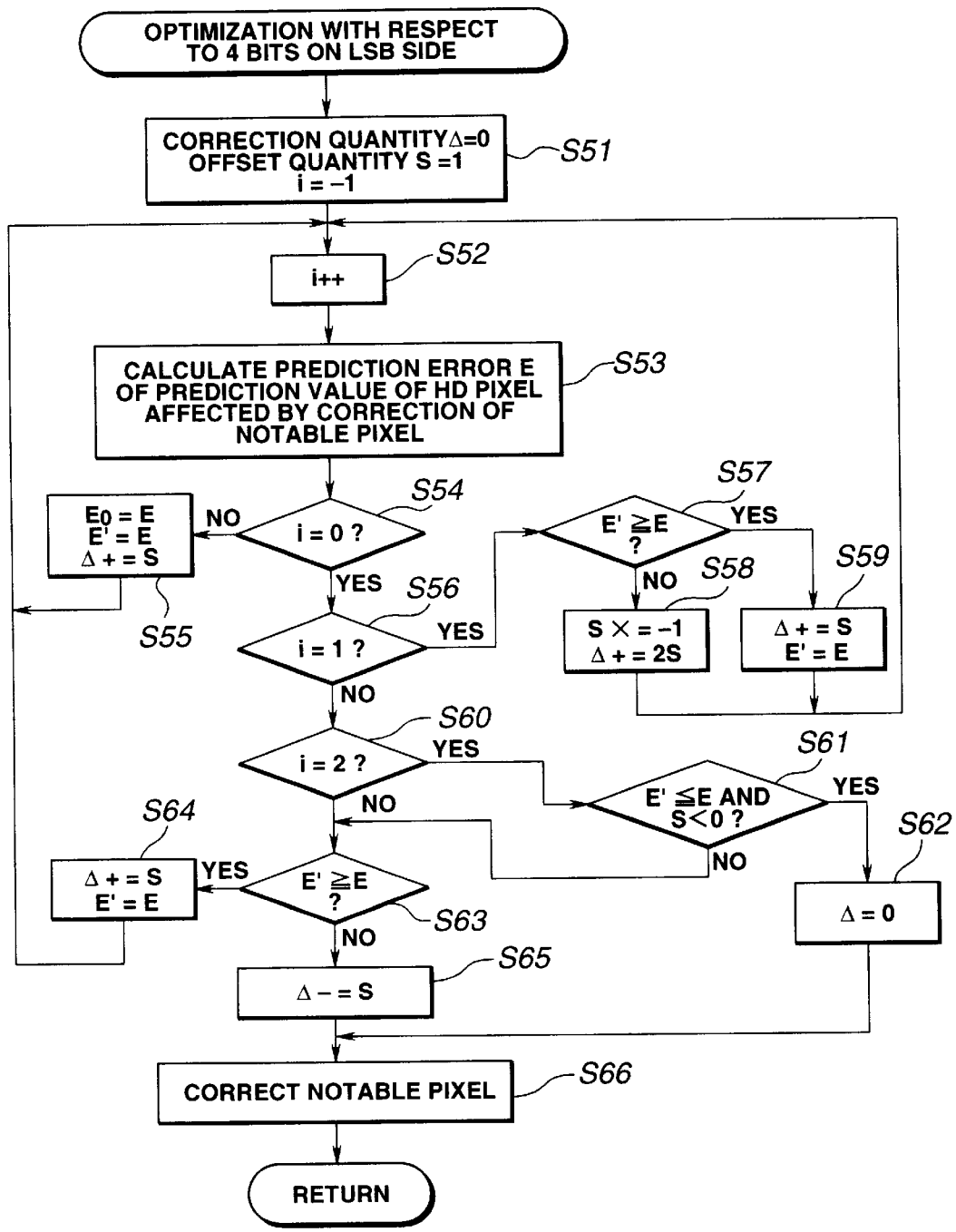
FIG. 21 is a flowchart for explaining the processing of step S14 of FIG. 16 further in detail.

The optimization processing on the four bits on the LSB side of the pixel value of the notable pixel at step S14 of FIG. 16 will now be described in detail with reference to the flowchart of FIG. 21.

Figure 19:
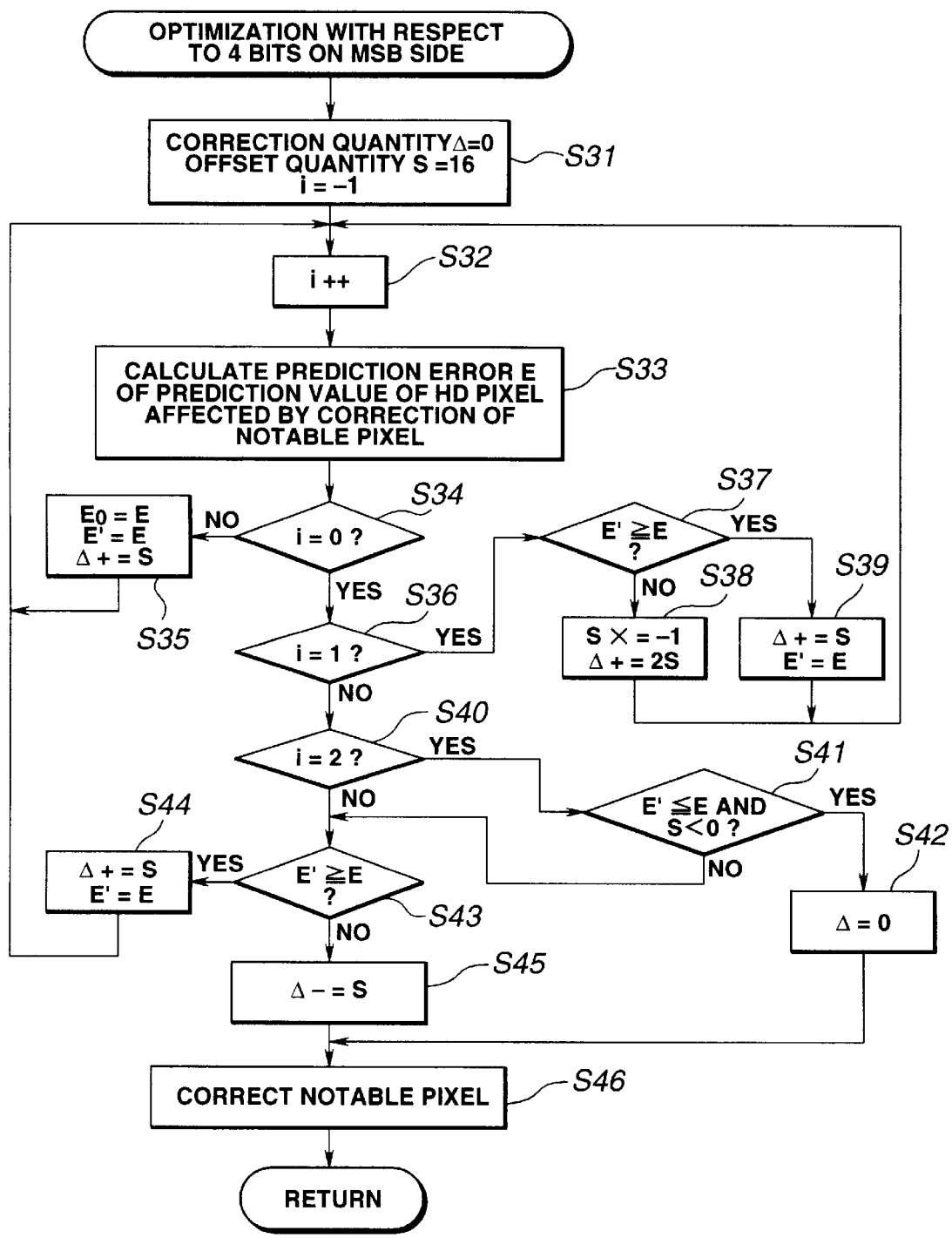
FIG. 19 is a flowchart for explaining the processing of step S13 of FIG. 16 further in detail.

In this case, processing basically similar to that of steps S31 to S46 of FIG. 19 is carried out at steps S51 to S66.

However, at step S51, the offset quantity S is set to 1 instead of 16 as an initial value. That is, in the present case, since the four bits on the LSB side of the pixel value of the notable pixel are the target of processing, the offset quantity S is set to 1 (=$2^0$), which is the minimum value for changing the four bits on the LSB side.

Figure 22:
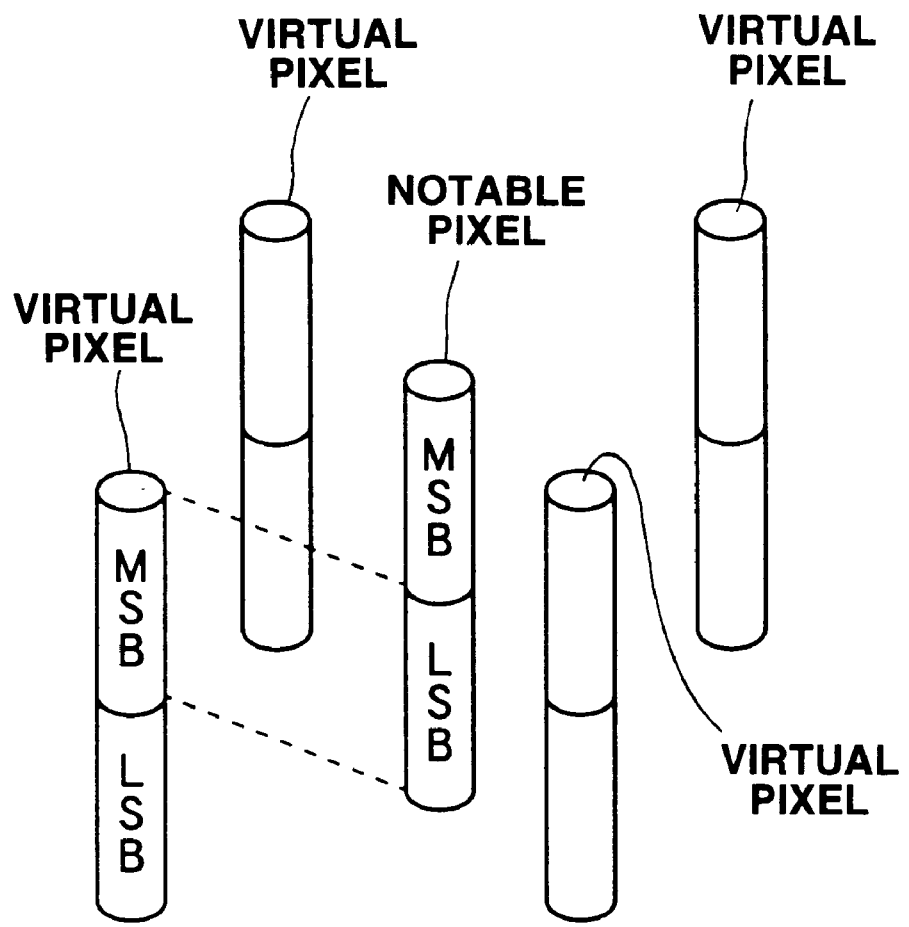
FIG. 22 is a view for explaining the processing of step S66 of FIG. 21.

At step S66, the pixel value of the notable pixel is corrected by the correction quantity Δ similarly to step S46 of FIG. 19, and the pixel value of the virtual pixel corresponding to the notable pixel is also corrected by the quantity 16 (=$2^4$) times the correction quantity Δ, for the following reason. That is, the four bits on the LSB side of the notable pixel express the four bits on the MSB side of the virtual pixel as described with reference to FIG. 11. If, for example, a virtual pixel adjacent to and obliquely leftward from the notable pixel corresponds to the notable pixel, as shown in FIG. 22, correction of the four bits on the LSB side of the notable pixel leads to correction of the four bits on the MSB side of the pixel value of the virtual pixel which is adjacent to and on lower left side of the notable pixel.

Figure 23:
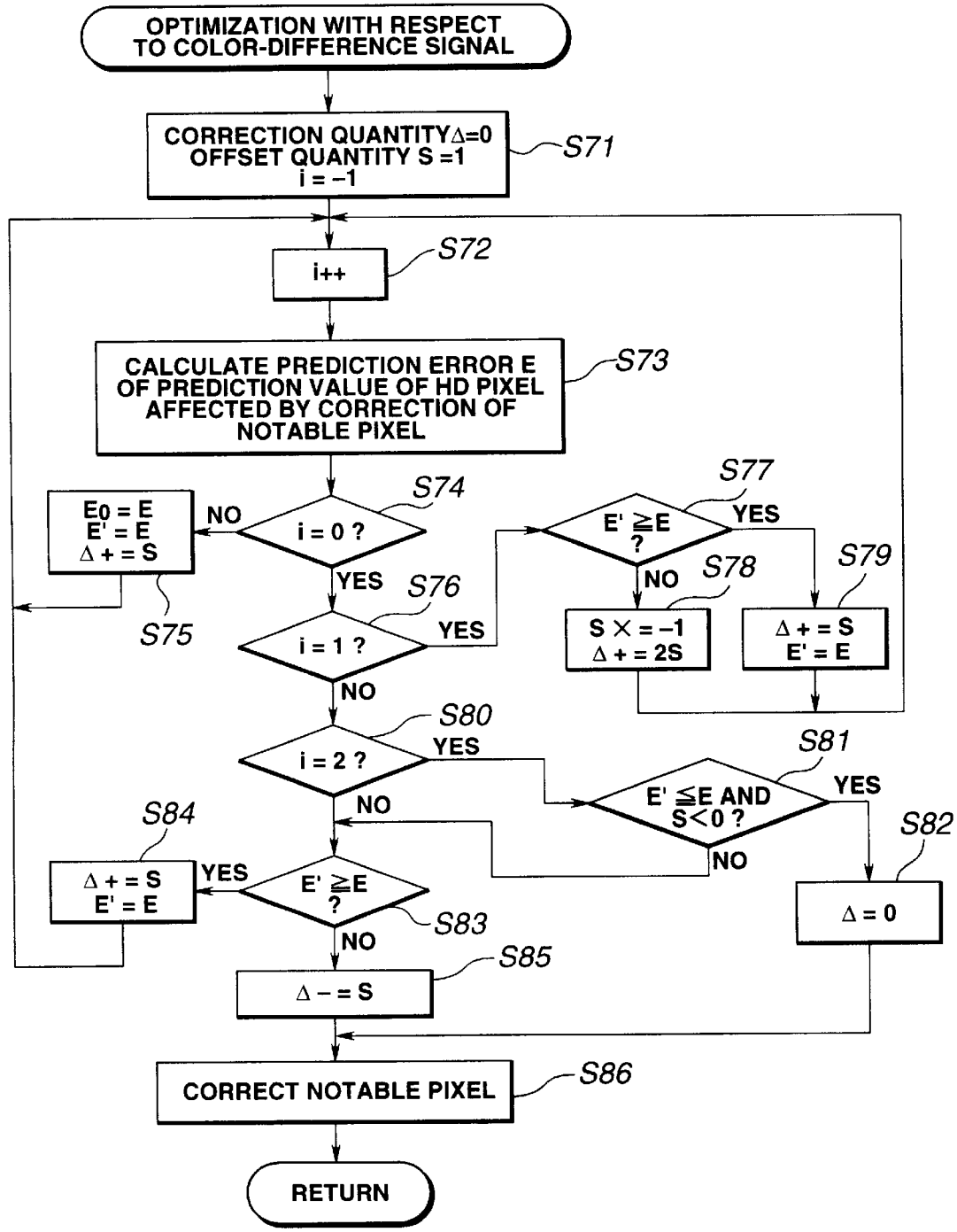
FIG. 23 is a flowchart for explaining the processing of step S15 of FIG. 16 further in detail.

The optimization processing in the case where the notable pixel is of the color-difference signal at step S15 of FIG. 16 will now be described in detail with reference to the flowchart of FIG. 23.

In this case, too, processing basically similar to that of steps S31 to S46 of FIG. 19 is carried out at steps S71 to S86.

However, at step S71, the offset quantity S is set to 1 instead of 16 as an initial value. That is, with respect to the color-difference signal, the offset quantity S is set to 1 (=$2^0$), which is the minimum value for changing the pixel value of eight bits.

Figure 24:
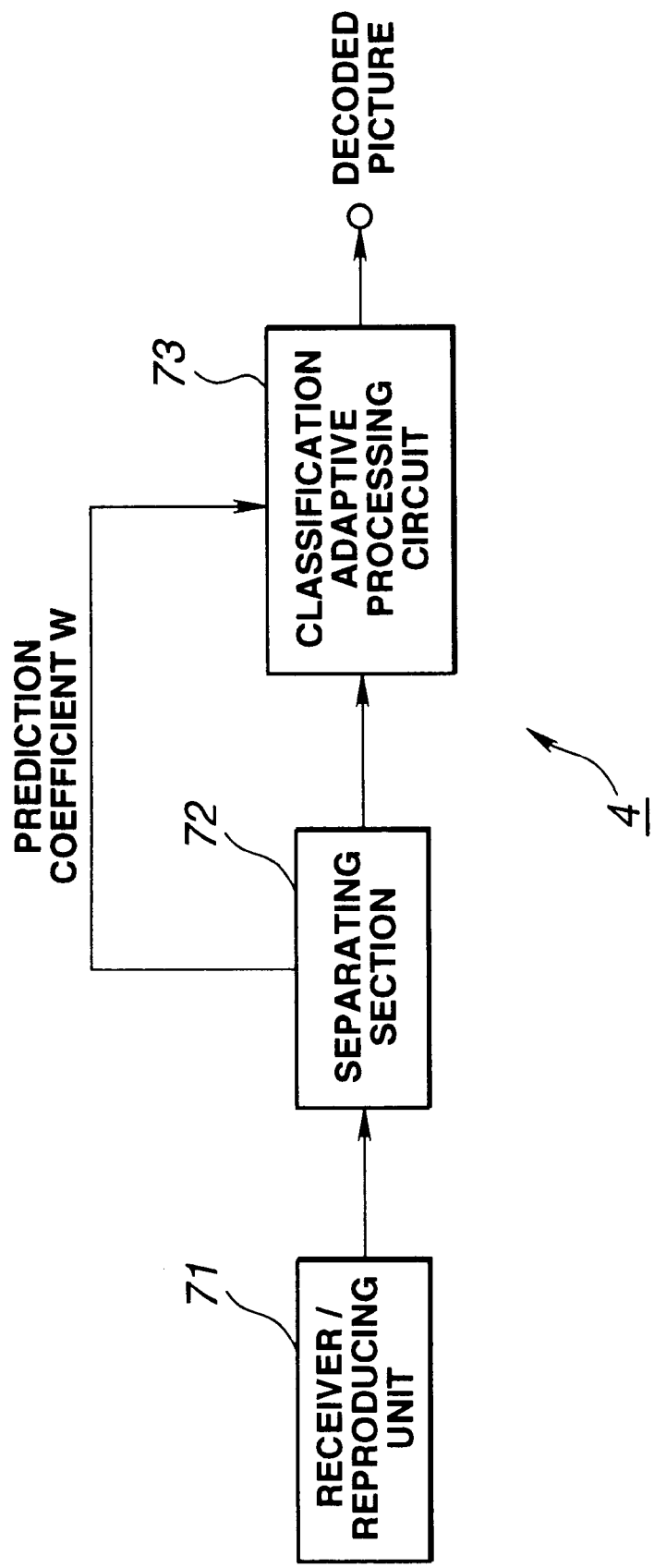
FIG. 24 is a block diagram showing an example of the structure of a receiving unit 4 of FIG. 5.

FIG. 24 shows an example of the structure of the receiving unit 4 of FIG. 5.

A receiver/reproducing unit 71 reproduces the coded data recorded on the recording medium 2 or receives the coded data transmitted through the transmission line 3, and supplies the coded data to a separating section 72. The separating section 72 separates the coded data into picture data of the SD picture (optimum SD picture) and the set of prediction coefficients w for every class. The picture data of the SD picture and the set of prediction coefficients w for every class are supplied to a classification adaptive processing circuit 73.

The classification adaptive processing circuit 73 finds the prediction value of the HD picture, similarly to the classification adaptive processing circuit 43 constituting the optimizing section 22 shown in FIG. 13, and outputs this prediction value. This decoded picture is substantially the same as the original picture.

Figure 25:
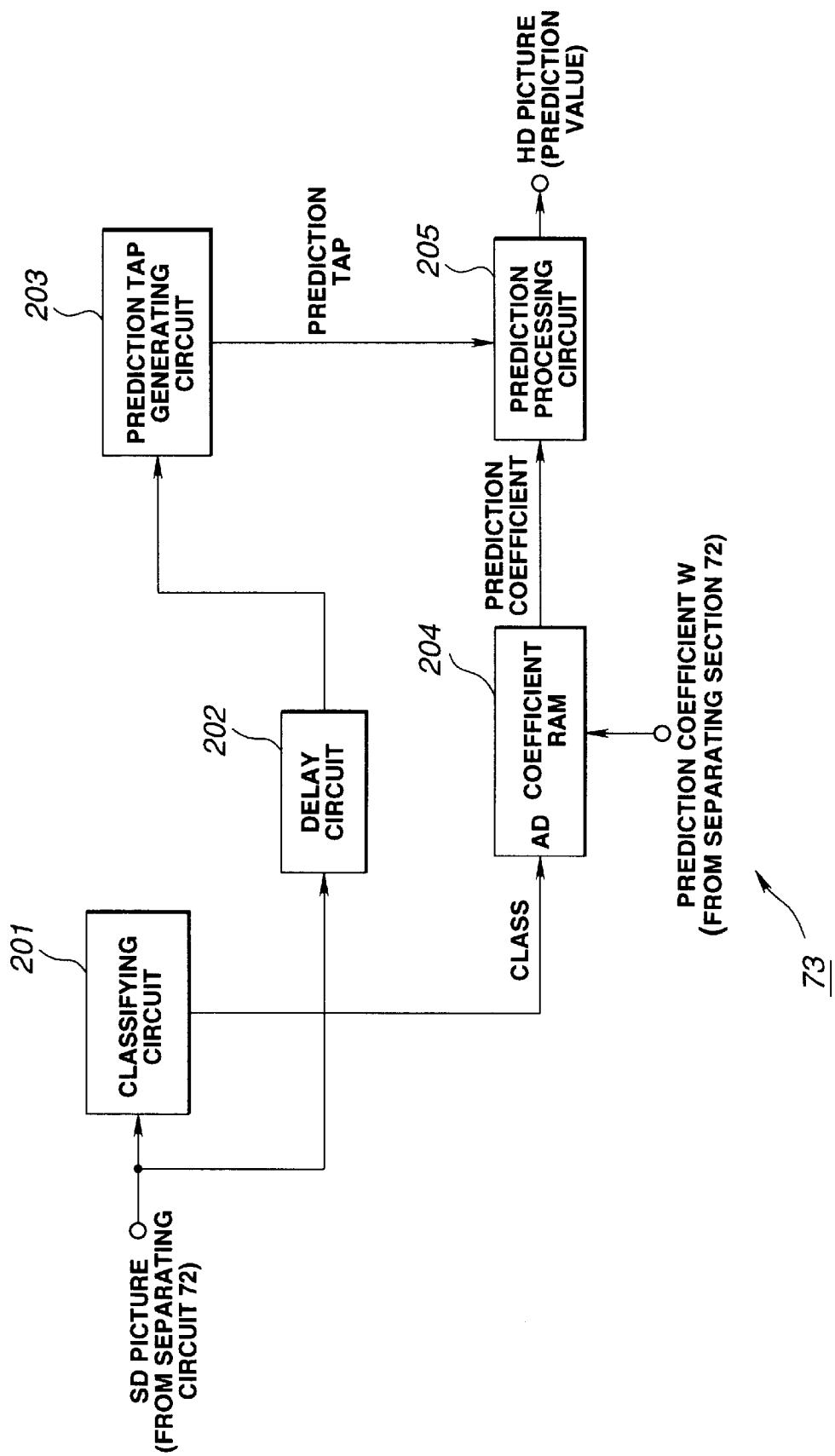
FIG. 25 is a block diagram showing an example of the structure of a classification adaptive processing circuit 73 of FIG. 25.

FIG. 25 shows an example of the structure of the classification adaptive processing circuit 73 of FIG. 24. The classification adaptive processing circuit 73 includes a classifying circuit 201, a delay circuit 202, a prediction tap generating circuit 203, a coefficient RAM 204, and a prediction processing circuit 205. These circuits have the structures similar to the classifying circuit 101, the delay circuit 102, the prediction tap generating circuit 103, the coefficient RAM 104', and the prediction processing circuit 105 of the classification adaptive processing circuit 43 of FIG. 15, respectively.

In the classification adaptive processing circuit 73 thus constituted, when the set of prediction coefficients for every class is supplied from the separating section 72, the set of prediction coefficients for every class is stored in the coefficient RAM 204. Then, the classification adaptive processing circuit 73 carries out processing similar to that of the classification adaptive processing circuit 43, with respect to the SD picture supplied from the separating section 72, by using the set of prediction coefficients for every class stored in the coefficient RAM 204. Thus, the prediction value of the HD picture is found.

Figure 26:
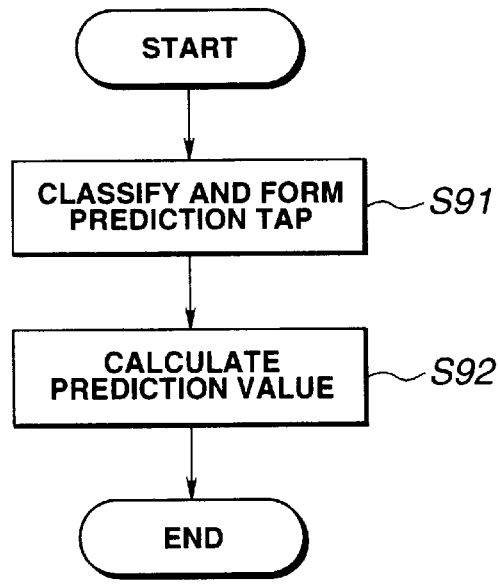
FIG. 26 is a flowchart for explaining the operation of the classification adaptive processing circuit 73.

Specifically, as shown in the flowchart of FIG. 26, the class tap as described in FIGS. 17A and 17B or the prediction tap as described in FIG. 18 is formed by the classifying circuit 201 or the prediction tap generating circuit 203, at step S91. In addition, the classifying circuit 201 classifies the class tap, and supplies the class thus obtained as an address to the coefficient RAM 204. The coefficient RAM 204 reads out the set of prediction coefficients corresponding to the class from the classifying circuit 201, and supplies the set of prediction coefficients to the prediction processing circuit 205.

At step S92, the prediction processing circuit 205 finds the prediction value of the HD picture by using the set of prediction coefficients from the coefficient RAM 204 and the prediction tap formed by the prediction tap generating circuit 203, and the operation ends.

On the receiving side, even when the receiving unit 4 as shown in FIG. 24 is not used, the decoded picture may be obtained by carrying out normal interpolation using a device for decoding a thinned picture by simple interpolation, without using the prediction coefficients. However, the decoded picture obtained in this case is deteriorated in picture quality (resolution).

As described above, virtual pixels are assumed near the SD pixels constituting the SD picture obtained by compressing the HD picture, and the pixel value of the virtual pixel is found from the HD picture. Therefore, the prediction tap may be formed by a number of pixels close to the notable pixel. As a result, a decoded picture of high picture quality may be obtained by using the prediction tap for decoding.

Also, since four bits on the MSB side of the pixel value of the virtual pixel are arranged in place of four bits on the LSB side of the pixel value of the SD pixel, the coding efficiency is not deteriorated.

In the above description, this invention is applied to the picture processing device for coding/decoding an HD picture. However, this invention may also be applied to the case where a picture or the like of standard resolution such as an SD picture is to be coded/decoded. For example, this invention may also be applied to the case where television signals of the standard system such as the NTSC system are to be coded/decoded. Particularly, this invention is effective for coding/decoding television signals of a so-called high-vision system having a large data quantity. Also, this invention may be applied to the case where so-called hierarchical coding for generating and decoding picture data of each hierarchy from an original picture is to be carried out.

In the above-described embodiment, though the prediction tap is formed by using virtual pixel signal, teethe luminance signal, the prediction tap may be similarly formed by using virtual pixels for the color-difference signal.

Also, in the above-described embodiment, though the prediction tap is formed on the basis of 5×7 pixels, the prediction tap is not limited to 5×7 pixels.

Figure 27:
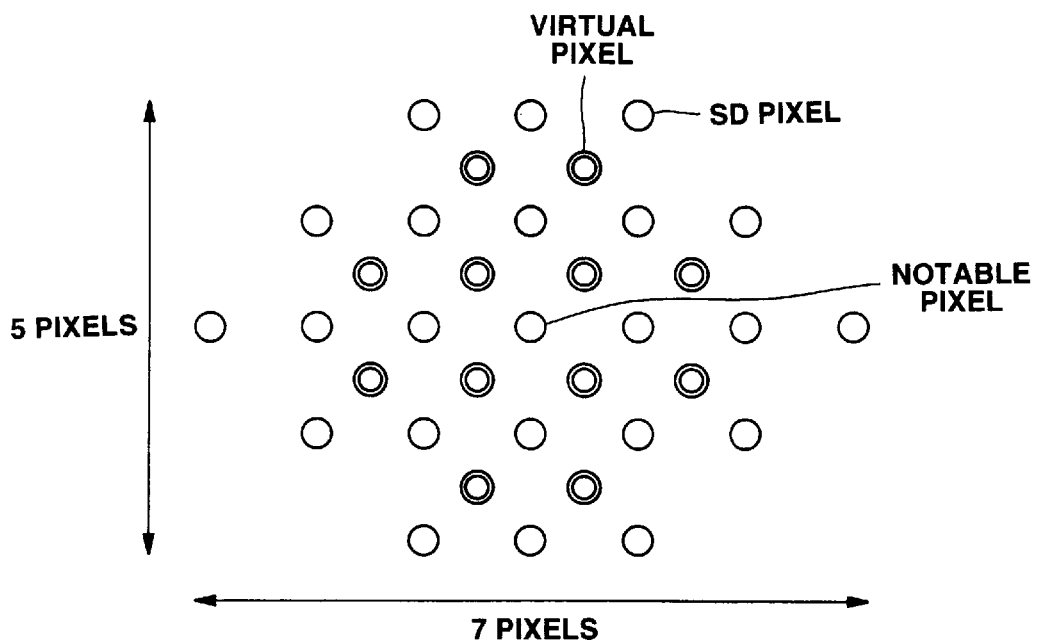
FIG. 27 is a view showing another example of the structure of a prediction tap.

In addition, in the above-described embodiment, the prediction tap consisting of 35 pixels as shown in FIG. 18 is formed on the basis of a block of 5×7 pixels, that is, 35 pixels, in the case where the prediction tap is to be formed by using virtual pixels. However, the prediction tap may also be formed by using a greater number of virtual pixels close to the notable pixel, instead of SD pixels far from the notable pixel, as shown in FIG. 27.

Also, in the above-described embodiment, four bits on the MSB side of the pixel value of the virtual pixel are arranged in place of four pixels on the LSB side of the pixel value of the SD pixel. However, three or two bits on the MSB side of the virtual pixel may also be arranged in place of three or two bits on the LSB side of the pixel value of the SD pixel. However, according to the simulation conducted by the present Inventor, in the case where the pixel value of the SD pixel is expressed by eight bits, the optimum S/N ratio is obtained with respect to a decoded picture such that four bits on the MSB side of the pixel value of the virtual pixel are arranged in place of four bits on the LSB side of the pixel value of the SD pixel. Also, as the number of bits to replace the pixel value of the SD pixel increases, the gradation tends to improve.

Moreover, in the above-described embodiment, though the SD picture is formed by thinning the HD picture at a ratio 1/9 by the thinning circuit 31, the SD picture may also be formed by thinning the HD picture at other thinning ratios.

Figure 10:
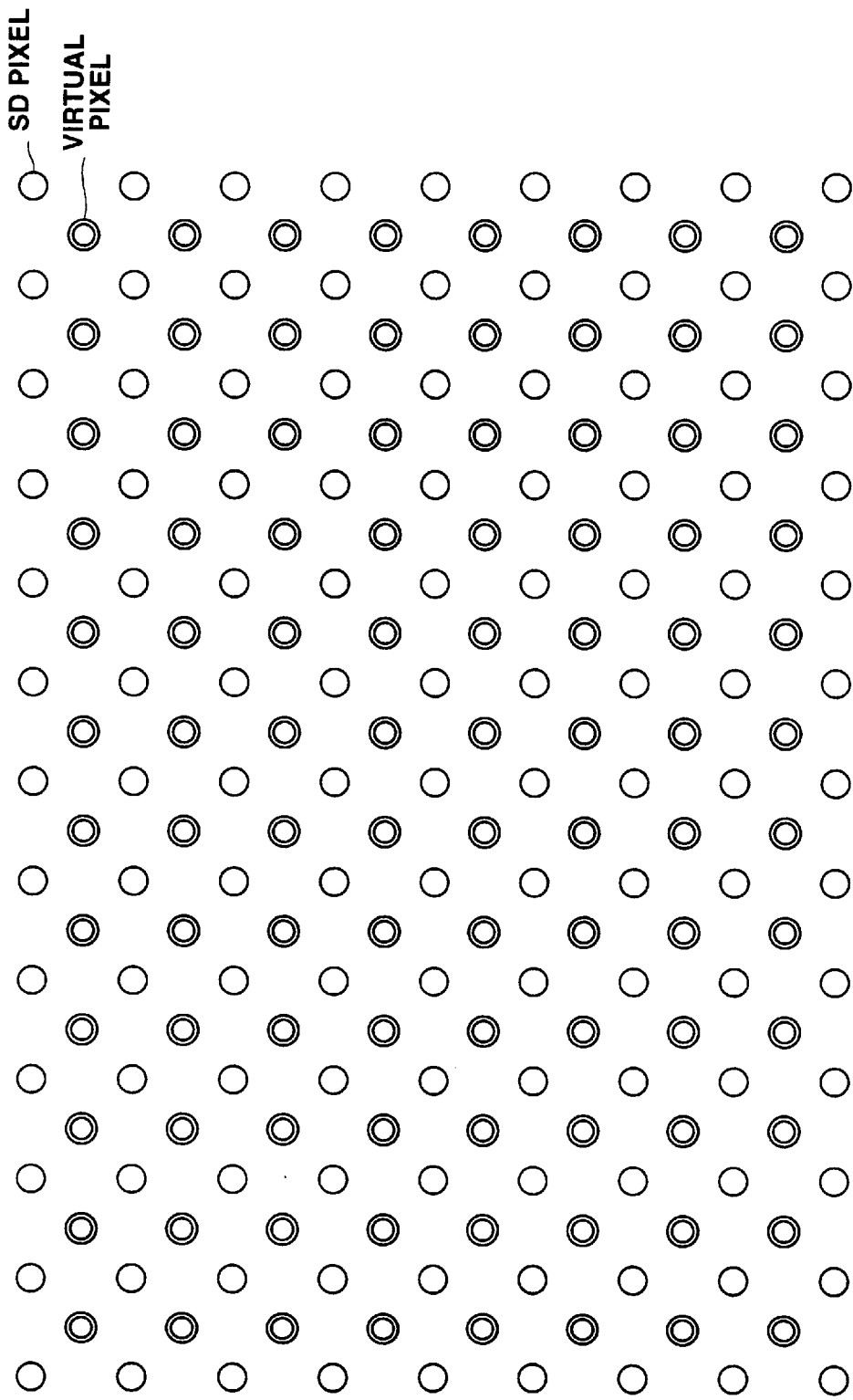
FIG. 10 is a view for explaining the processing of a virtual pixel forming circuit 32 of FIG. 8.

In the above-described embodiment, though one virtual pixel is provided between SD pixels which are obliquely adjacent to each other as shown in FIG. 10, two or more virtual pixels may be provided between such SD pixels.

In addition, in the above-described embodiment, the classification adaptive processing (prediction coefficient generating) circuit 41 is provided in the optimizing section 22 (FIG. 13) constituting the transmitting unit 1 so as to update the set of prediction coefficients for every class. However, a set of prediction coefficients for every class found in advance may be used without updating the set of prediction coefficients. That is, it is possible to find a set of prediction coefficients for every class in advance by learning in the learning device as shown in FIG. 25, and use the set of prediction coefficients in the classification adaptive processing circuit 43. In this case, the classification adaptive processing circuit 43 may have a structure similar to that of the picture converting device shown in FIG. 1, and the set of prediction coefficients for every class found in advance by the learning device may be stored in the coefficient ROM 104. In this case, the classification adaptive processing (prediction coefficient generating) circuit 41 need not be provided, thus enabling simplification of the transmitting unit 1.

In the receiving unit 4 (FIG. 24) corresponding to such transmitting unit 1, the set of prediction coefficients for every class found in advance is stored, so as to allow the classification adaptive processing circuit 73 to find the prediction value by using the set of prediction coefficients for every class. In this case, the classification adaptive processing circuit 73 may have a structure similar to that of the picture converting device shown in FIG. 1. The set of prediction coefficients for every class is found in advance by learning in the learning device shown in FIG. 3, and the set of prediction coefficients for every class may be stored in the coefficient ROM 104.

In FIG. 19, the correction quantity Δ which first minimizes the prediction error E is detected by correcting the pixel value of the notable pixel by 16 as the offset quantity S. However, it is also possible to find the prediction error E with respect to all the possible pixel values of the notable pixel, then detect the minimum value thereof, and correct the pixel value of the notable pixel by the correction quantity Δ. In this case, though processing is time-consuming, a decoded picture having a high S/N ratio may be obtained.

In addition, in the case where the prediction error E with respect to all the possible pixel values of the notable pixel is to be found, the initial value of the pixel value of the notable pixel may be any value (within the range of possible pixel values of the notable pixel). That is, in this case, no matter what value the initial value is, the correction quantity Δ for minimizing the prediction error E may be found.

The foregoing is similarly applied to the processing described with reference to FIGS. 21 and 23.

INDUSTRIAL APPLICABILITY

In the picture signal encoding device and the picture signal encoding method according to the present invention, a compressed picture signal having a number of pixels smaller than the number of pixels of an original picture signal is generated, and a virtual pixel near is assumed a compressed pixel of a pixel constituting the original picture signal so as to calculate the pixel value of the virtual pixel from the original picture signal. A part of the pixel value of the compressed pixel is replaced with a part of the pixel value of the virtual pixel, and one of compressed pixels constituting the compressed picture signal is used as a notable pixel so as to form a prediction tap from the compressed pixels near the notable pixel and the virtual pixel. A prediction value of the original picture signal is predicted from the prediction tap and a predetermined prediction coefficient, and a prediction error of a prediction picture signal constituted by the predicted prediction value with respect to the original picture signal is calculated. The pixel value of the compressed pixel constituting the compressed picture signal is corrected in accordance with the prediction error. Thus, a decoded picture more proximate to the original picture may be obtained without deteriorating the coding efficiency.

In the picture signal decoding device and the picture signal decoding method according to the present invention, one of compressed pixels constituting the coded picture signal is used as a notable pixel so as to form a prediction tap from pixels near the notable pixel, and a pixel value of a restored picture signal is generated from the prediction tap and a predetermined prediction coefficient. The coded picture signal to be decoded is generated by generating a compressed picture signal having a number of pixels smaller than the number of pixels of an original picture signal, assuming a virtual pixel near a compressed pixel of a pixel constituting the original picture signal so as to calculate the pixel value of the virtual pixel from the original picture signal, replacing a part of the pixel value of the compressed pixel with a part of the pixel value of the virtual pixel, using one of compressed pixels constituting the compressed picture signal as a notable pixel so as to form a prediction tap from the compressed pixels near the notable pixel and the virtual pixel, predicting a prediction value of the original picture signal from the prediction tap and a predetermined prediction coefficient, calculating a prediction error of a prediction picture signal constituted by the predicted prediction value with respect to the original picture signal, and correcting the pixel value of the compressed pixel constituting the compressed picture signal in accordance with the prediction error. Thus, in the picture signal decoding device and the picture signal decoding method according to the present invention, a decoded picture more proximate to the original picture may be obtained.

On a recording medium decodable by a machine according to the present invention, a recording signal is recorded. The recording signal is generated by generating a compressed picture signal having a number of pixels smaller than the number of pixels of an original picture signal, assuming a virtual pixel near a compressed pixel of a pixel constituting the original picture signal so as to calculate the pixel value of the virtual pixel from the original picture signal, replacing a part of the pixel value of the compressed pixel with a part of the pixel value of the virtual pixel, using one of compressed pixels constituting the compressed picture signal as a notable pixel so as to form a prediction tap from the compressed pixels near the notable pixel and the virtual pixel, predicting a prediction value of the original picture signal from the prediction tap and a predetermined prediction coefficient, calculating a prediction error of a prediction picture signal constituted by the predicted prediction value with respect to the original picture signal, and correcting the pixel value of the compressed pixel constituting the compressed picture signal in accordance with the prediction error. Thus, a decoded picture more proximate to the original picture may be obtained from the recording signal.

We claim:

1. A picture signal encoding device for encoding a picture signal comprising:

a compressing section for generating a compressed picture signal having a number of pixels smaller than the number of pixels of an original picture signal;

a first calculating section for assuming a virtual pixel near a compressed pixel of a pixel constituting the original picture signal so as to calculate the pixel value of the virtual pixel from the original picture signal;

a replacing section for replacing a part of the pixel value of the compressed pixel with a part of the pixel value of the virtual pixel;

a forming section for using one of compressed pixels constituting the compressed picture signal as a notable pixel so as to form a prediction tap from the compressed pixels near the notable pixel and the virtual pixel;

a predicting section for predicting a prediction value of the original picture signal from the prediction tap and a predetermined prediction coefficient;

a second calculating section for calculating a prediction error of a prediction picture signal constituted by the predicted prediction value with respect to the original picture signal; and a correcting section for correcting the pixel value of the compressed pixel constituting the compressed picture signal in accordance with the prediction error.

2. The picture signal encoding device as claimed in claim 1, further comprising:

an arithmetic section for calculating the prediction coefficient on the basis of the original picture signal and the compressed picture signal or the corrected compressed picture signal; and a transmitting section for transmitting an optimum compressed picture signal and the prediction coefficient.

3. The picture signal encoding device as claimed in claim 1, wherein the predetermined prediction coefficient is calculated in advance by learning from a learning picture signal and a learning compressed picture signal, and wherein the predicting section has a memory for storing the prediction coefficient.

4. The picture signal encoding device as claimed in claim 1, wherein the predetermined prediction coefficient is constituted by a prediction coefficient for every class corresponding to characteristics of the compressed picture signal, the device further comprising:

an arithmetic section for calculating the prediction coefficient for every class on the basis of the original picture signal and the compressed picture signal or the corrected picture signal; and a transmitting section for transmitting an optimum compressed picture signal and the prediction coefficient for every class;

the predicting section predicting the prediction value from the prediction coefficient of a class corresponding to the characteristics of the compressed picture signal and the prediction tap.

5. The picture signal encoding device as claimed in claim 1, wherein the predetermined prediction coefficient is constituted by a prediction coefficient for every class corresponding to characteristics of the compressed picture signal, and wherein the predicting section predicts the prediction value from the prediction coefficient of a class corresponding to the characteristics of the compressed picture signal and the prediction tap.

6. The picture signal encoding device as claimed in claim 5, wherein the prediction coefficient for every class is calculated from a learning picture signal and a learning compressed picture signal, for every class corresponding to characteristics of the learning compressed picture signal, and wherein the predicting section has a memory for storing the prediction coefficient for every class.

7. The picture signal encoding device as claimed in claim 1, wherein the replacing section replaces a predetermined bit from LSB of the pixel value of the compressed pixel with a predetermined bit from MSB of the pixel value of the virtual pixel.

8. A picture signal decoding device for decoding a coded picture signal comprising:

a forming section for using one of compressed pixels constituting the coded picture signal as a notable pixel so as to form a prediction tap from pixels near the notable pixel; and a generating section for generating a pixel value of a restored picture signal from the prediction tap and a predetermined prediction coefficient;

the coded picture signal being generated by generating a compressed picture signal having a number of pixels smaller than the number of pixels of an original picture signal, assuming a virtual pixel near a compressed pixel of a pixel constituting the original picture signal so as to calculate the pixel value of the virtual pixel from the original picture signal, replacing a part of the pixel value of the compressed pixel with a part of the pixel value of the virtual pixel, using one of compressed pixels constituting the compressed picture signal as a notable pixel so as to form a prediction tap from the compressed pixels near the notable pixel and the virtual pixel, predicting a prediction value of the original picture signal from the prediction tap and a predetermined prediction coefficient, calculating a prediction error of a prediction picture signal constituted by the predicted prediction value with respect to the original picture signal, and correcting the pixel value of the compressed pixel constituting the compressed picture signal in accordance with the prediction error.

9. The picture signal decoding device as claimed in claim 8, wherein the predetermined prediction coefficient is supplied together with the coded picture signal.

10. The picture signal decoding device as claimed in claim 8, wherein the predetermined prediction coefficient is calculated in advance from a learning picture signal and a learning compressed picture signal, and wherein the generating section has a memory for storing the prediction coefficient.

11. The picture signal decoding device as claimed in claim 8, wherein the predetermined prediction coefficient is constituted by a prediction coefficient for every class corresponding to characteristics of the compressed picture signal, the prediction coefficient for every class being supplied together with the coded picture signal.

12. The picture signal decoding device as claimed in claim 8, wherein the predetermined prediction coefficient is constituted by a prediction coefficient for every class corresponding to characteristics of the compressed picture signal, and wherein the generating section predicts the prediction value from the prediction coefficient of a class corresponding to the characteristics of the compressed picture signal and the prediction tap.

13. The picture signal decoding device as claimed in claim 12, wherein the prediction coefficient for every class is calculated from a learning picture signal and a learning compressed picture signal, for every class corresponding to characteristics of the learning compressed picture signal, and wherein the generating section has a memory for storing the prediction coefficient for every class.

14. The picture signal decoding device as claimed in claim 8, wherein a predetermined bit from LSB of the pixel value of the pixel of the coded picture signal is replaced with a predetermined bit from MSB of the pixel value of the virtual pixel.

15. A picture signal encoding method for encoding a picture signal comprising:

a step of generating a compressed picture signal having a number of pixels smaller than the number of pixels of an original picture signal;

a step of assuming a virtual pixel near a compressed pixel of a pixel constituting the original picture signal so as to calculate the pixel value of the virtual pixel from the original picture signal;

a step of replacing a part of the pixel value of the compressed pixel with a part of the pixel value of the virtual pixel;

a step of using one of compressed pixels constituting the compressed picture signal as a notable pixel so as to form a prediction tap from the compressed pixels near the notable pixel and the virtual pixel;

a step of predicting a prediction value of the original picture signal from the prediction tap and a predetermined prediction coefficient;

a step of calculating a prediction error of a prediction picture signal constituted by the predicted prediction value with respect to the original picture signal; and a step of correcting the pixel value of the compressed pixel constituting the compressed picture signal in accordance with the prediction error.

16. The picture signal encoding method as claimed in claim 15, further comprising:

a step of calculating the prediction coefficient on the basis of the original picture signal and the compressed picture signal or the corrected compressed picture signal; and a step of transmitting an optimum compressed picture signal and the prediction coefficient.

17. The picture signal encoding method as claimed in claim 15, wherein the predetermined prediction coefficient is calculated in advance by learning from a learning picture signal and a learning compressed picture signal, and wherein the step of predicting the prediction value of the original picture signal uses the prediction coefficient.

18. The picture signal encoding method as claimed in claim 15, wherein the predetermined prediction coefficient is constituted by a prediction coefficient for every class corresponding to characteristics of the compressed picture signal, the method further comprising:

a step of calculating the prediction coefficient for every class on the basis of the original picture signal and the compressed picture signal or the corrected picture signal; and a step of transmitting an optimum compressed picture signal and the prediction coefficient for every class;

the step of predicting the prediction value of the original picture signal predicting the prediction value from the prediction coefficient of a class corresponding to the characteristics of the compressed picture signal and the prediction tap.

19. The picture signal encoding method as claimed in claim 15, wherein the predetermined prediction coefficient is constituted by a prediction coefficient for every class corresponding to characteristics of the compressed picture signal, and wherein the step of predicting the prediction value of the original picture signal predicts the prediction value from the prediction coefficient of a class corresponding to the characteristics of the compressed picture signal and the prediction tap.

20. The picture signal encoding method as claimed in claim 19, wherein the prediction coefficient for every class is calculated from a learning picture signal and a learning compressed picture signal, for every class corresponding to characteristics of the learning compressed picture signal, and wherein the step of predicting the prediction value of the original picture signal uses the prediction coefficient for every class.

21. The picture signal encoding method as claimed in claim 15, wherein the step of replacing a part of the pixel value of the compressed pixel replaces a predetermined bit from LSB of the pixel value of the compressed pixel with a predetermined bit from MSB of the pixel value of the virtual pixel.

22. A picture signal decoding method for decoding a coded picture signal comprising:

a step of using one of compressed pixels constituting the coded picture signal as a notable pixel so as to form a prediction tap from pixels near the notable pixel; and a step of generating a pixel value of a restored picture signal from the prediction tap and a predetermined prediction coefficient;

the coded picture signal being is generated by generating a compressed picture signal having a number of pixels smaller than the number of pixels of an original picture signal, assuming a virtual pixel near a compressed pixel of a pixel constituting the original picture signal so as to calculate the pixel value of the virtual pixel from the original picture signal, replacing a part of the pixel value of the compressed pixel with a part of the pixel value of the virtual pixel, using one of compressed pixels constituting the compressed picture signal as a notable pixel so as to form a prediction tap from the compressed pixels near the notable pixel and the virtual pixel, predicting a prediction value of the original picture signal from the prediction tap and a predetermined prediction coefficient, calculating a prediction error of a prediction picture signal constituted by the predicted prediction value with respect to the original picture signal, and correcting the pixel value of the compressed pixel constituting the compressed picture signal in accordance with the prediction error.

23. The picture signal decoding method as claimed in claim 22, wherein the predetermined prediction coefficient is supplied together with the coded picture signal.

24. The picture signal decoding method as claimed in claim 22, wherein the predetermined prediction coefficient is calculated in advance from a learning picture signal and a learning compressed picture signal, and wherein the step of generating the pixel value of the restored picture signal uses the prediction coefficient.

25. The picture signal decoding method as claimed in claim 22, wherein the predetermined prediction coefficient is constituted by a prediction coefficient for every class corresponding to characteristics of the compressed picture signal, the prediction coefficient for every class being supplied together with the coded picture signal.

26. The picture signal decoding method as claimed in claim 22, wherein the predetermined prediction coefficient is constituted by a prediction coefficient for every class corresponding to characteristics of the compressed picture signal, and wherein the step of generating the pixel value of the restored picture signal predicts the prediction value from the prediction coefficient of a class corresponding to the characteristics of the compressed picture signal and the prediction tap.

27. The picture signal decoding method as claimed in claim 26, wherein the prediction coefficient for every class is calculated from a learning picture signal and a learning compressed picture signal, for every class corresponding to characteristics of the learning compressed picture signal, and wherein the step of generating the pixel value of the restored picture signal uses the prediction coefficient for every class.

28. The picture signal decoding method as claimed in claim 22, wherein a predetermined bit from LSB of the pixel value of the pixel of the coded picture signal is replaced with a predetermined bit from MSB of the pixel value of the virtual pixel.

29. A recording medium decodable by a machine, the recording medium having a recording signal recorded thereon, the recording signal being generated by generating a compressed picture signal having a number of pixels smaller than the number of pixels of an original picture signal, assuming a virtual pixel near a compressed pixel of a pixel constituting the original picture signal so as to calculate the pixel value of the virtual pixel from the original picture signal, replacing a part of the pixel value of the compressed pixel with a part of the pixel value of the virtual pixel, using one of compressed pixels constituting the compressed picture signal as a notable pixel so as to form a prediction tap from the compressed pixels near the notable pixel and the virtual pixel, predicting a prediction value of the original picture signal from the prediction tap and a predetermined prediction coefficient, calculating a prediction error of a prediction picture signal constituted by the predicted prediction value with respect to the original picture signal, and correcting the pixel value of the compressed pixel constituting the compressed picture signal in accordance with the prediction error.

* * * * *